United States Patent [19]

Mislin et al.

[11] 4,058,516
[45] Nov. 15, 1977

[54] SULFO GROUP-CONTAINING AZO COMPOUNDS HAVING A TETRAZO COMPONENT RADICAL DERIVED FROM AN OPTIONALLY SUBSTITUTED 3,8-DIAMINODIBENZOFURAN

[75] Inventors: Roland Mislin, Saint-Louis, France; Hanspeter Uehlinger, Basel, Switzerland

[73] Assignee: Sandoz Ltd., Basel, Switzerland

[21] Appl. No.: 481,181

[22] Filed: June 20, 1974

Related U.S. Application Data

[63] Continuation-in-part of Ser. No. 376,512, July 5, 1973, abandoned.

[30] Foreign Application Priority Data

June 29, 1973   Netherlands ........................ 7309117
July 4, 1972    Switzerland ....................... 10091/72

[51] Int. Cl.² ............ C09B 35/34; C09B 43/00; C09B 43/12; C09B 43/18
[52] U.S. Cl. ................. 260/152; 260/145 B; 260/146 R; 260/146 D; 260/146 T; 260/147; 260/153; 260/154; 260/159; 260/160; 260/164; 260/165; 260/346.22
[58] Field of Search ............... 260/152, 153, 154, 160, 260/161, 165, 164, 159

[56] References Cited

U.S. PATENT DOCUMENTS

| 423,569 | 3/1890 | Ott ...................................... 260/152 |
| 432,989 | 7/1890 | Duisberg ............................ 260/152 |
| 499,216 | 6/1893 | Duisberg ............................ 260/152 |
| 1,624,944 | 4/1927 | Glietenberg ....................... 260/152 |
| 2,032,627 | 3/1936 | Muth ................................... 260/152 |
| 2,059,852 | 11/1936 | Dahlen et al. ...................... 260/152 |
| 2,128,508 | 8/1938 | Stusser et al. ...................... 260/152 |
| 2,138,553 | 11/1938 | Muth ................................... 260/152 |
| 2,752,333 | 6/1956 | Lecher et al. .................... 260/152 X |
| 2,879,266 | 3/1959 | Anderson ........................... 260/152 |
| 3,574,181 | 4/1971 | Forter et al. ...................... 260/152 |

FOREIGN PATENT DOCUMENTS

| 51,570 | 4/1889 | Germany ............................ 260/152 |
| 54,154 | 5/1889 | Germany ............................ 260/152 |
| 78,625 | 5/1893 | Germany ............................ 260/152 |
| 82,074 | 6/1893 | Germany ............................ 260/152 |
| 84,991 | 2/1895 | Germany ............................ 260/152 |

OTHER PUBLICATIONS

Cullinane, J. Chem. Soc., 1932, 2365-2367.

Primary Examiner—Charles F. Warren
Attorney, Agent, or Firm—Gerald D. Sharkin; Richard E. Vila; Melvyn M. Kassenoff

[57] ABSTRACT

Dyes of the formula

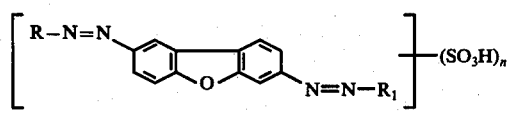

and substituted derivatives thereof, wherein R is a coupling component radical,
  $R_1$ is a coupling component radical, with the proviso that R and $R_1$ are different, and
  n is 1 to 8, are disclosed. They are useful for dyeing and printing natural and synthetic polyamides, cotton and other cellulosic fibers, polypropylene fibers modified by basic groups, synthetic polyamides and polyesters modified by acid groups, paper and leather. They exhibit good fastness to light, wet treatments and abrasion.

44 Claims, No Drawings

SULFO GROUP-CONTAINING AZO COMPOUNDS HAVING A TETRAZO COMPONENT RADICAL DERIVED FROM AN OPTIONALLY SUBSTITUTED 3,8-DIAMINODIBENZOFURAN

This application is a continuation in-part of our co-pending application Ser. No. 376,512, filed July 5, 1973, and now abandoned.

This invention relates to new dibenzofuran derived azo dyestuffs containing sulphonic acid groups.

The invention provides compounds of formula I,

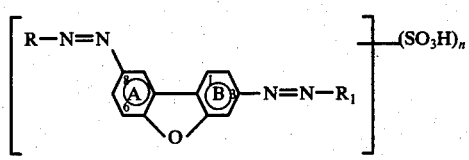

in which R signifies the radical of a coupling component,

R$_1$ signifies the radical of a coupling component differing from R, and n signifies an integer from 1 to 8, and the aromatic rings A and/or B may be unsubstituted or substituted by a substituent usual in azo chemistry, and the sulphonic acid group or groups may be present on rings A or B or in radicals R and R$_1$. R, R$_1$ and rings A and B, independently may be substituted, for example, by metallizable and/or fiber-reactive groups. The compounds may be in metallized form.

The invention thus concerns asymmetric disazo and polyazo dyestuffs having at least one sulphonic acid group, whereby the —SO$_3$H groups may occur in the aromatic rings A and/or B and/or in the radicals R or R$_1$. The azo compounds of formula I preferably contain p-sulphonic acid groups, p standing for 1, 2, 3 or 4, and the —SO$_3$H group or groups occur mainly in the radicals R and/or R$_1$. Dyestuffs in which the aromatic rings A and B carry no further substituents are to be emphasized in particular. The invention embraces especially azo compounds of the formula:

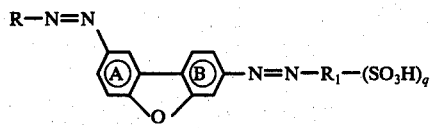

in which q signifies 1, 2 or 3, azo compounds of the formulae:

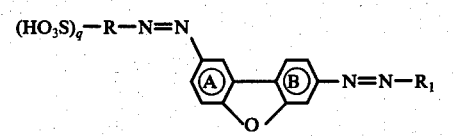

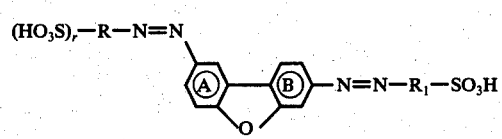

in which r signifies 1 or 2 or:

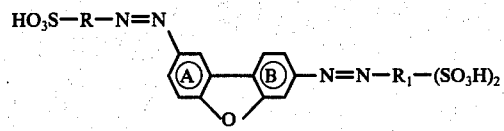

R, R$_1$ and rings A and B being as defined above.

The invention also embraces azo compounds of the formulae:

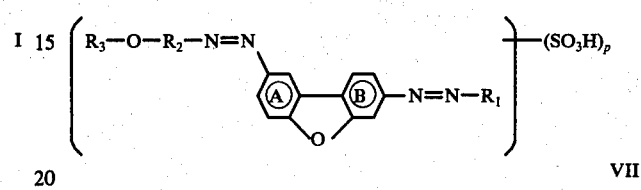

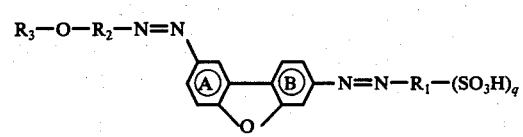

in which

R$_2$ signifies an arylene radical which is unsubstituted or substituted, and

R$_3$ signifies a hydrocarbon radical or acyl radical which is unsubstituted or substituted, R$_1$ and rings A and B being as defined above.

In the compounds of formulae VI and VII, p preferably signifies 1, 2, 3 or 4.

Other preferred compounds are of the formula:

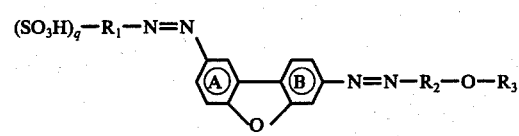

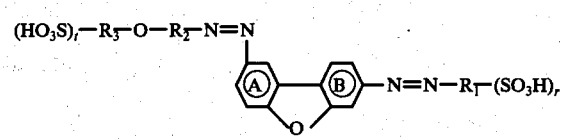

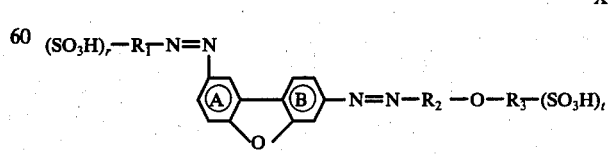

or

XI (SO$_3$H)$_r$—R$_1$—N=N

...—N=N—R$_2$—O—R$_3$—(SO$_3$H)$_t$ in which t signifies 0 or 1.

Similarly interesting azo compounds have the formula:

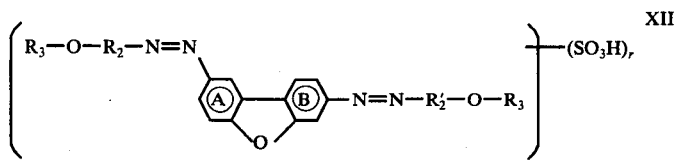
XII in which $R_{2'}$ denotes an optionally substituted arylene radical differing from $R_2$, or azo compounds of the formula:

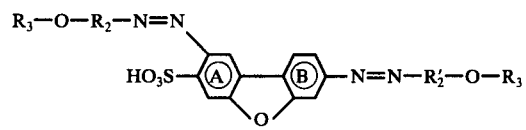
XIII

The aromatic rings $R_2$ and/or $R_{2'}$ may be substituted in the compounds of formulae XII and XIII by carboxylic acid groups and/or sulphonamide groups.

Similarly interesting azo compounds conform to the formula:

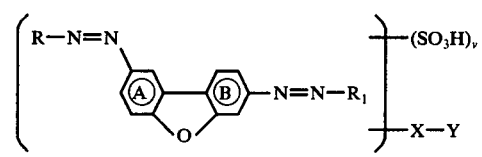
XV in which
X signifies a direct bond or bi- or tri- valent bridge member,
Y signifies a fibre-reactive radical, and $v$ signifies 2, 3 or 4.

The compounds of formula XV contain preferably 3 or 4 sulphonic acid groups, such groups preferably being on the R and $R_1$ groups.

Other compounds of formula I are those of the formulae:

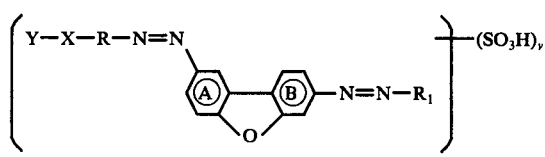
XVI

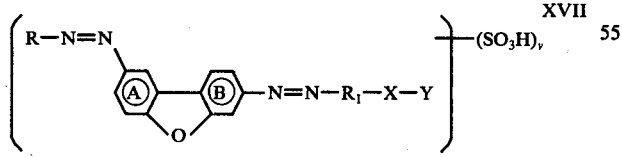
XVII or in particular of the formulae:

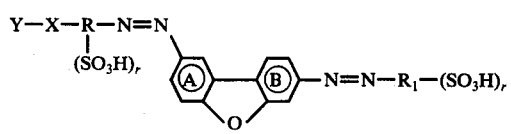
XVIII

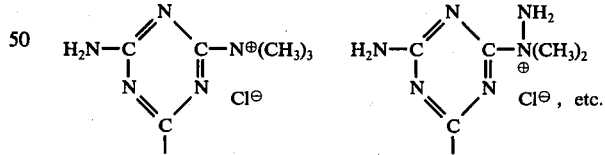

in which $w$ signifies 2 or 3.

As examples of fibre-reactive groups, e.g. for the radical Y, in the compounds of the invention, there may be given the radical of di- or trihalogen-1,3,5-triazines, or di-, tri- or tetra-halopyrimidines, alkylsulphonyl halogen pyrimidines, or else acyl radicals carrying a substituent detachable as an anion and/or a —C—C— multiple bond capable of addition. Such compounds are described, for example, in the British Pat. Nos. 1,144,477 and 1,145,385. Suitable reactive groups, for instance, are chloroacetyl, beta-chloropropionyl, alpha-chloroacryloyl, 2,3-dichloroquinoxdyl-6-carbonyl, beta-(4,5-dichloropyridazonyl-1)-propionyl, 4,6-dichloro-1,3,5-triazinyl-2, 2,6-dichloropyrimidyl-4, 2,5,6-trichloropyrimidyl-4, 4-chloro-6-amino-1,3,5-triazinyl-2, 4-chloro-6-(4'-sulphophenylamino)-1,3,5-triazinyl-2, 5-chloro-2,6-difluoropyrimidyl-4,β-sulfatoethylsulfonyl, or

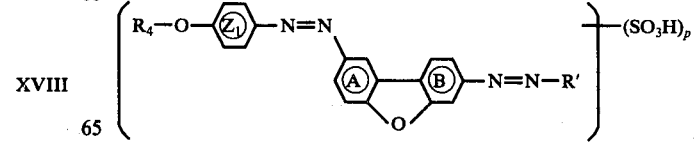

Other compounds of formula I are of the formula:

XXII or

XXIII

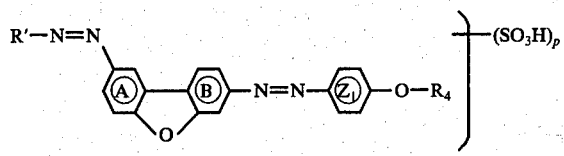
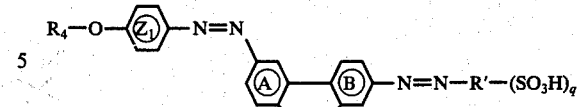 XXV in which
R$_4$ signifies an alkyl radical of low molecular weight which is unsubstituted or substituted, in particular the methyl of ethyl radical, or a phenylsulfonyl radical of the formulae:

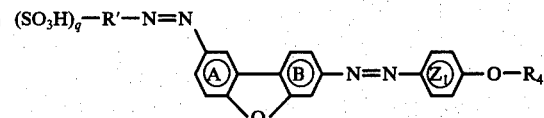 XXVI

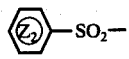 XXIV

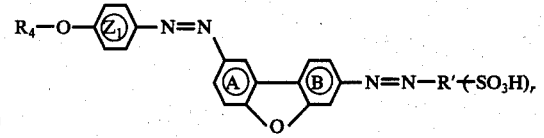 XXVII and
R' signifies the radical of a coupling component of the benzene, pyrazolone-5, aminopyrazole, naphthalene or heterocyclic series or the radical of an acetoacetylamino compound, and the aromatic rings Z$_1$ and/or Z$_2$ are unsubstituted or substituted. The acetoacetylamino compound may be unsubstituted or N-substituted.

More specifically, the foregoing groups include the compounds of the formulae:

or

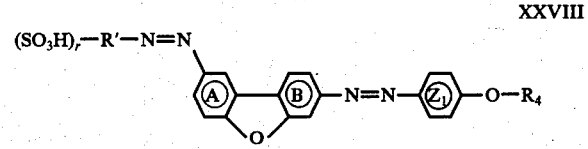 XXVIII or in particular those of the formulae:

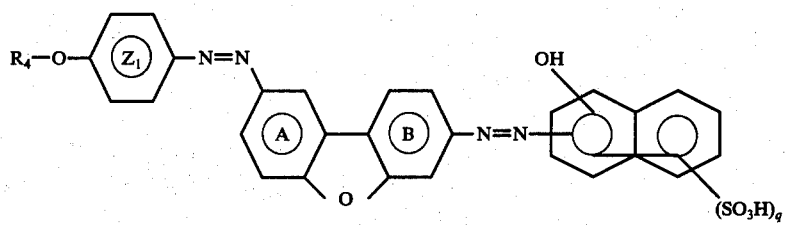 XXIX

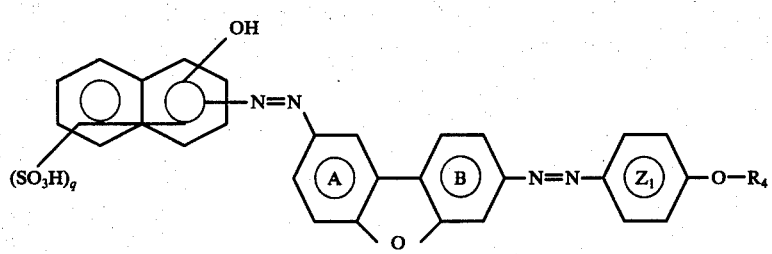 XXX

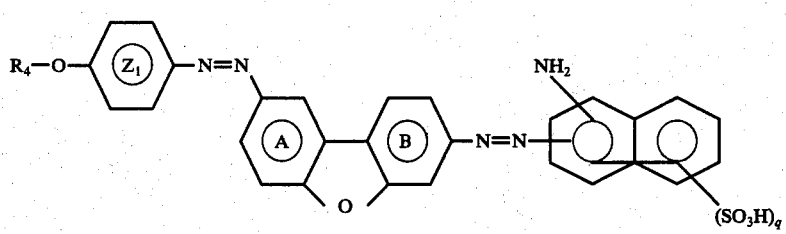 XXXI

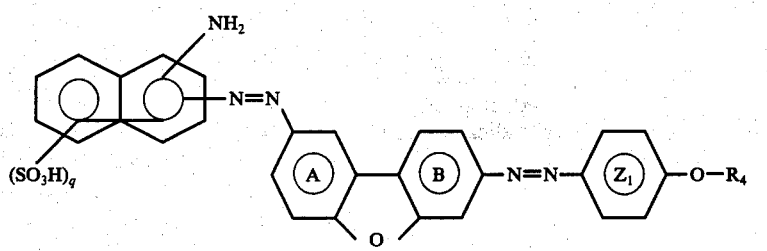 XXXII

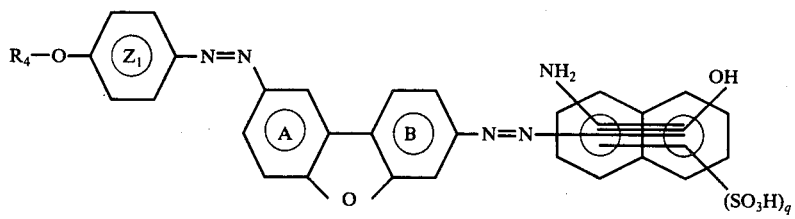
XXXIII
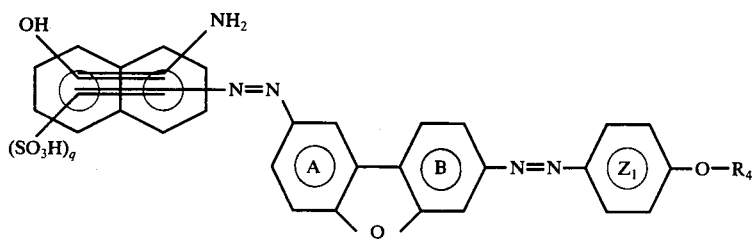
XXXIV
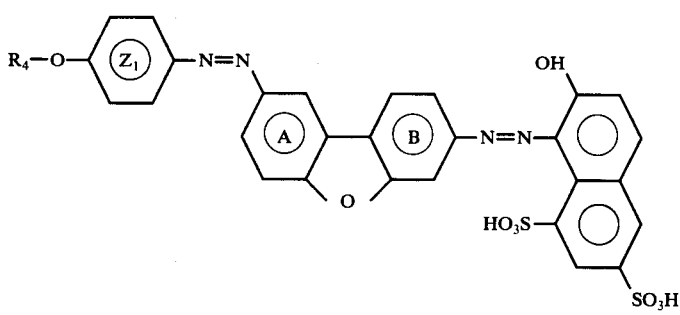
XXXV
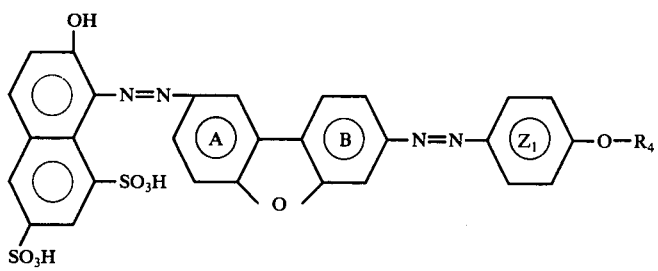
XXXVI
or of the formula
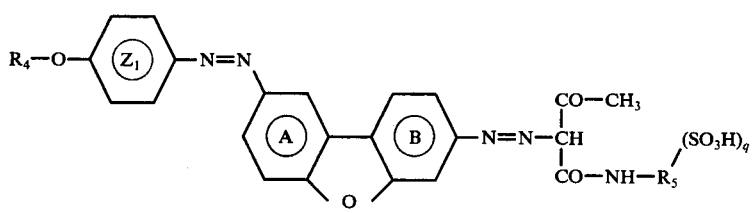
XXXVII
in which $R_5$ is an alkyl or aryl radical substituted by $q$ —SO$_3$H groups, preferably by 1 or 2 sulphonic acid groups, and otherwise unsubstituted or further substituted, such as a phenyl or naphthyl radical, or azo compounds of the formula:
XXXVIII
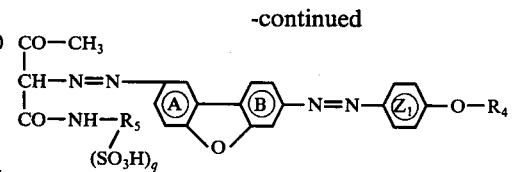
or azo compounds of the formula:

XXXIX

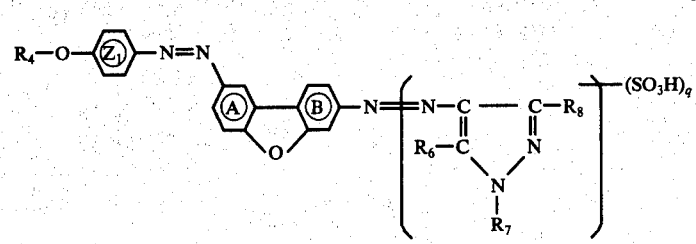

in which $R_6$ signifies —OH, —O—$SO_2$—$R_9$ or a radical of the formula

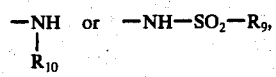

$R_7$ signifies hydrogen or an acyl or hydrocarbon radical which is unsubstituted or substituted, for example an optionally substituted alkyl, phenyl or naphthyl radical, $R_8$ signifies an alkyl or alkoxy radical of low molecular weight which is unsubstituted or substituted, acetyl, carboxyl or carboxylic acid amide radical, $R_9$ signifies a hydrocarbon radical which is unsubstituted or substituted, $R_{10}$ signifies hydrogen or a hydrocarbon radical which is unsubstituted or substituted, as azo compounds of the formula:

XL

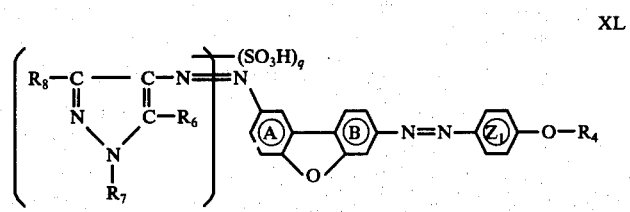

There are likewise suitable azo compounds of the formula:

XLI

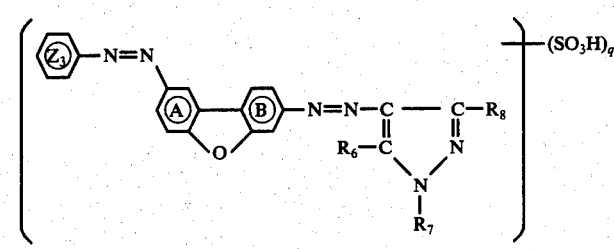

in which the aromatic ring $Z_3$ is substituted by a substituent making coupling possible, for example a hydroxyl or amino group, e.g. a primary, secondary or tertiary amino group, or azo compounds of the formula:

XLII

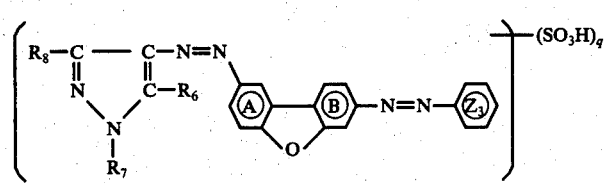

or of the formula

XLIII

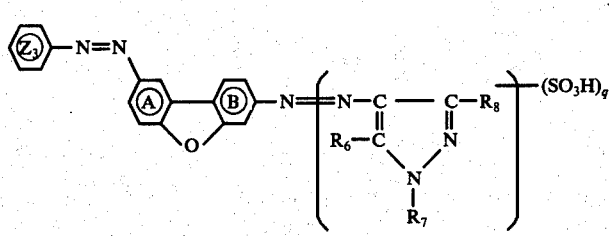

or of the formula

XLIV

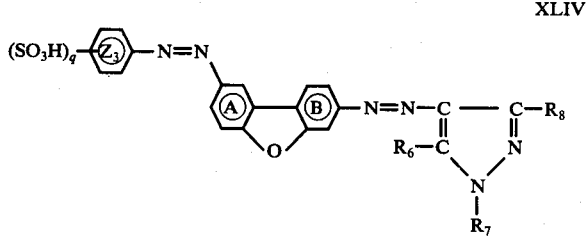

or of the formula

XLV

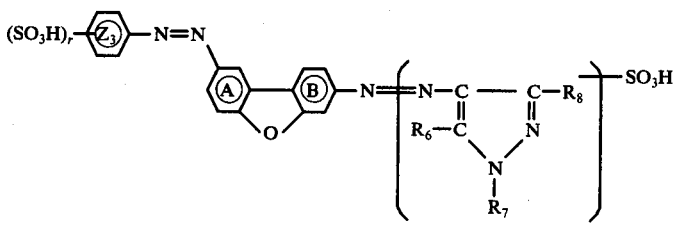

or of the formula

XLVI

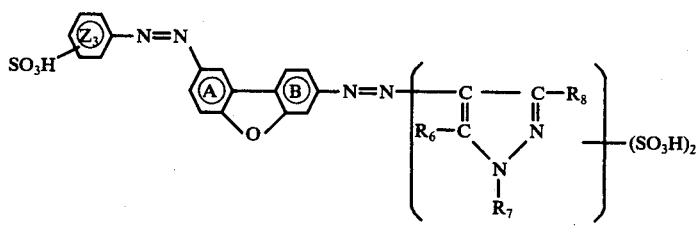

or of the formula

XLVII

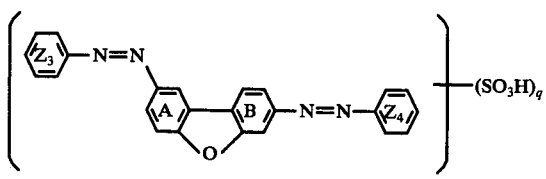

in which the aromatic ring $Z_4$ is substituted by a substituent making coupling possible, such as a hydroxyl or amino group, e.g. by a primary, secondary or tertiary amino group, or the formula:

XLVIII

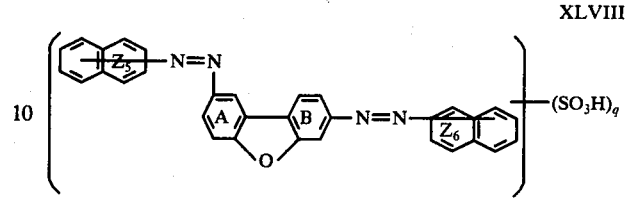

in which the aromatic rings $Z_5$ and $Z_6$ are substituted by a substituent making coupling possible, such as a hydroxyl or amino group, e.g. by a primary, secondary or tertiary amino group or of the formula:

XIL or of the formula:

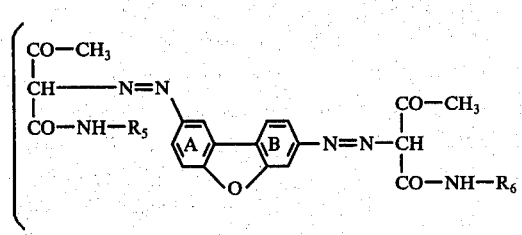 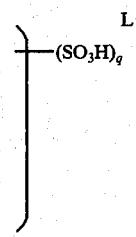 L
or of the formula:
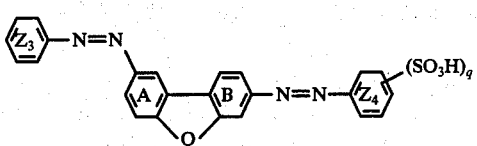
or of the formula:
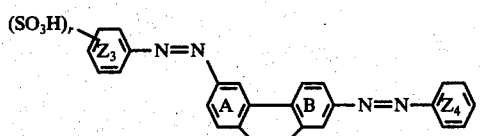
or of the formula:
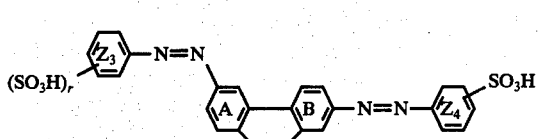
or of the formula:
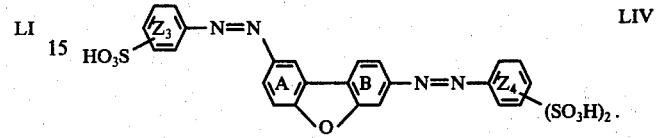 LI
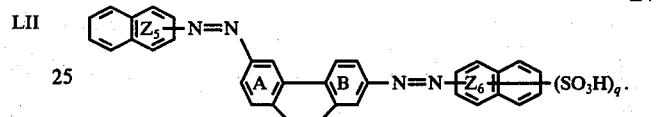 LIV
or of the formula:
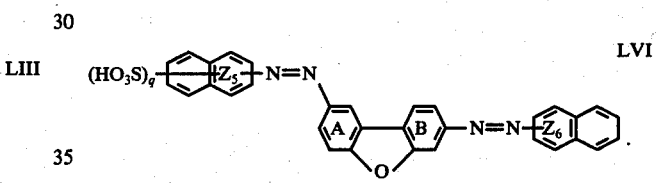 LII LV
or of the formula:
LIII 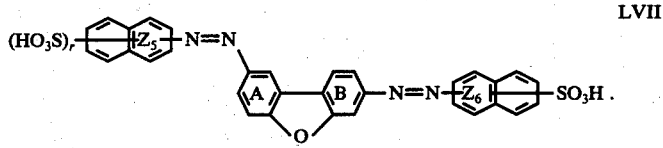 LVI
or of the formula:
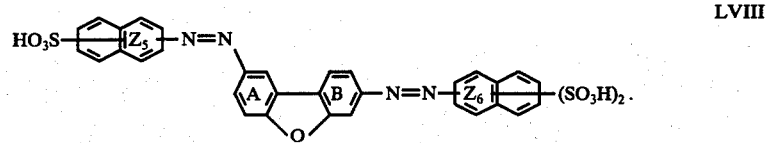 LVII
or of the formula:
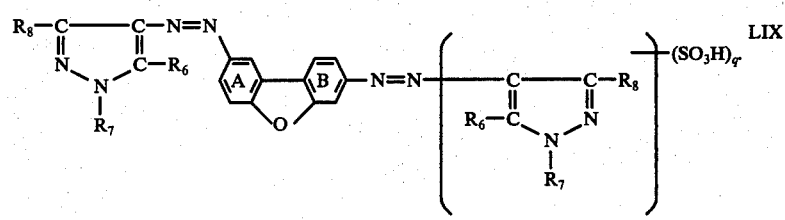 LVIII
or of the formula:
LIX
or of the formula:

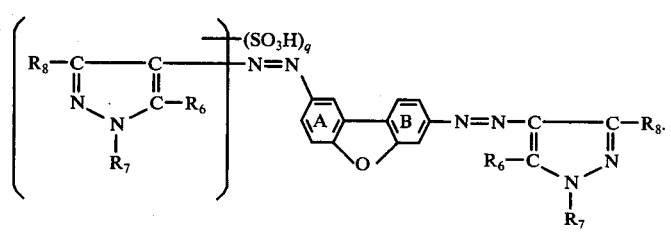
LX
or of the formula:
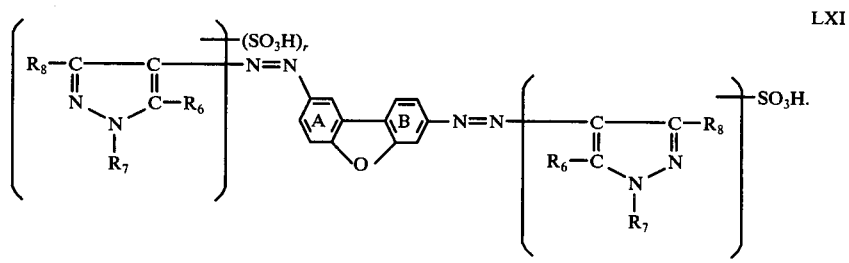
LXI
or of the formula:
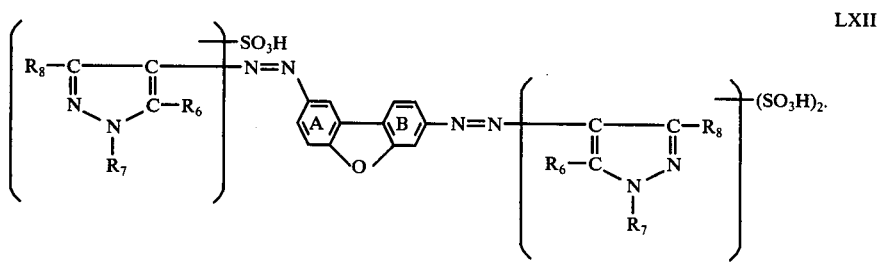
LXII
or of the formula:
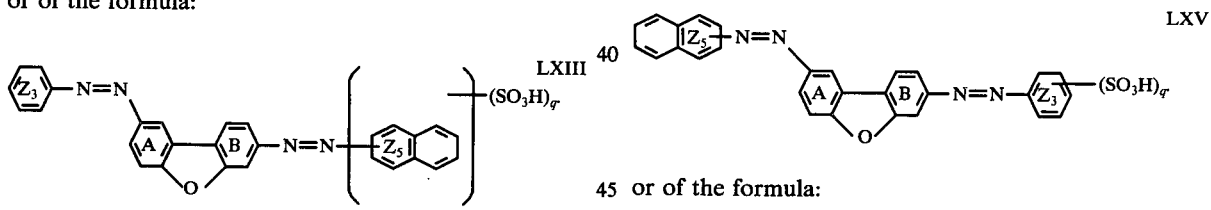
LXIII LXV
or of the formula:
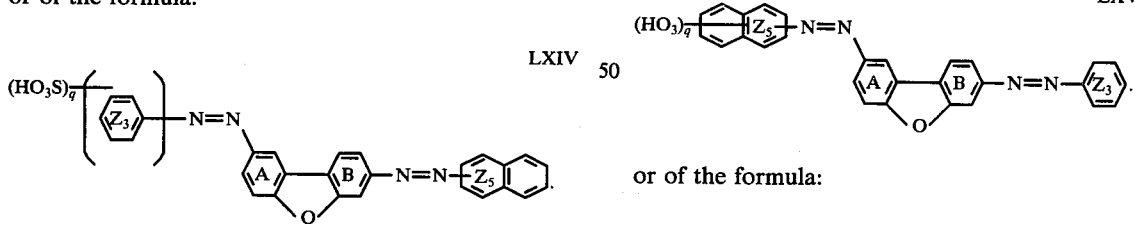
LXIV LXVI
or of the formula:
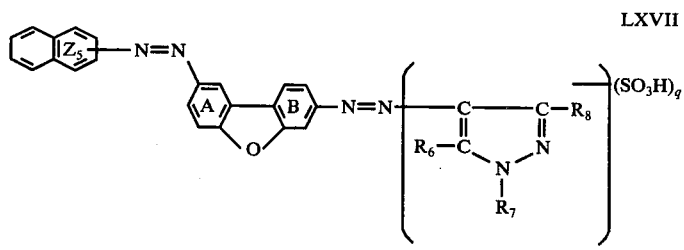
LXVII
or of the formula:

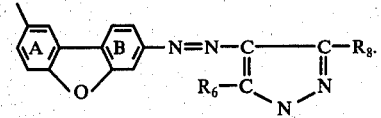

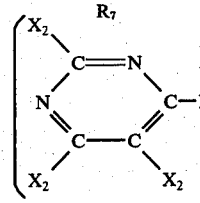

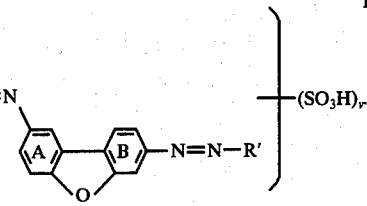

Suitable reactive groups are for instance the radicals already mentioned, or in particular 4,6-di-chloro-1,3,5-triazinyl-2,2,6-dichloro-or 2,6-difluoropyrimidyl-4.

Suitable compounds of this type are of the formula:

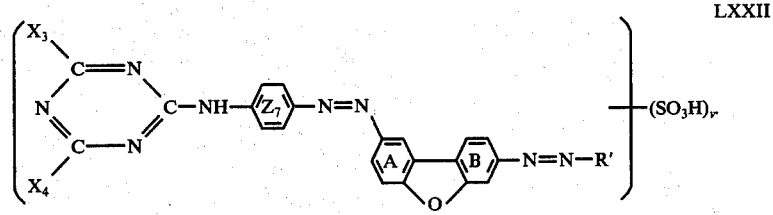

in which one or two $X_2$ signifies hydrogen and the others signify chlorine, bromine or fluorine, or compounds of the formula:

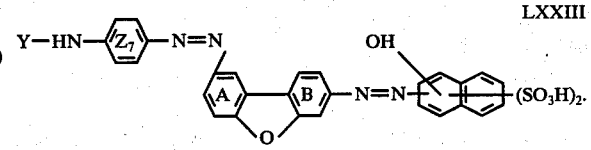

in which
 $X_3$ signifies hydrogen, chlorine bromine or fluorine, and
 $X_4$ signifies chlorine, bromine or fluorine,
or in particular of the formula:

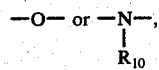

Similarly suitable azo compounds conform to the formulae:

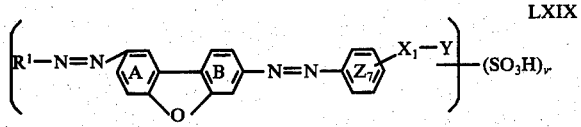

in which
 R' signifies the radical of a coupling component of the benzene, pyrazolone-5, aminopyrazole, naphthalene or hetero cyclic series or the radical of an acetoacetylamino compound,
 $X_1$ signifies a bivalent bridge member, such as an alkylene or arylene radical which is unsubstituted or substituted, $$-O- \text{ or } -N-,$$
$$\quad\quad\quad\quad\;\; R_{10}$$

Y is the radical of a fibre-reactive compound, and
V signifies 2, 3 or 4
and the aromatic ring $Z_7$ is substituted by a substituent making coupling possible and otherwise unsubstituted or substituted,
or of the formula:

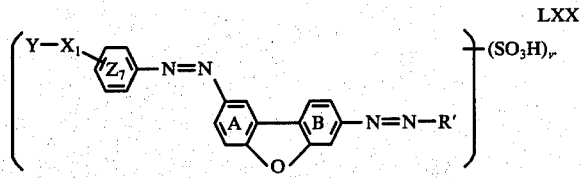

By analogy all the compounds of the formulae LXX to LXXIII may be of similar structure to those of formulae II to VII or XVI to XXI with regard to their asymmetric structure and the position of the —$SO_3H$ groups in the molecule.

The invention also includes those azo compounds of formula I in which R and/or $R_1$ denote radicals of compounds containing metals; the new azo compounds of formula I may be used also to produce metalliferous compounds of formula I, if compounds of formula I in which the aromatic rings A and/or B and/or the radicals R and/or $R_1$ contain groups capable of forming metallic complexes and occupying an advantageous ortho position to the azo groups are treated in the substance or on the fibre with metal-releasing compounds. Thus they may be, for example, 1:1 and/or 1:2 metal complex dyestuffs. Accordingly, they may contain a metal atom such as iron, cobalt, copper, nickel, manganese, aluminum chromium or zinc in a complex bond.

The dyestuffs indicated below may be obtained as metal complex dyestuffs by metallizing the corresponding non-metalliferous dyestuffs, which can be done during manufacture or on the fibre, using known methods. They correspond to the formula:

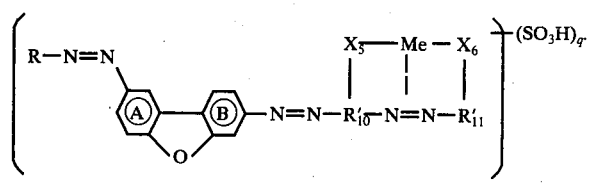

or of the formula:

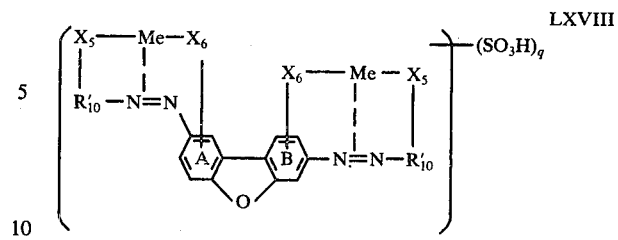

or in particular of the formula:

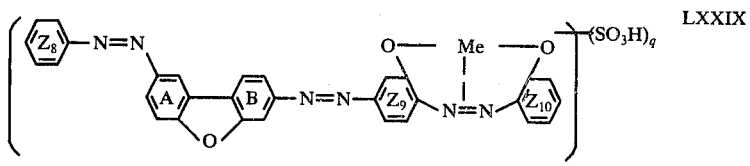

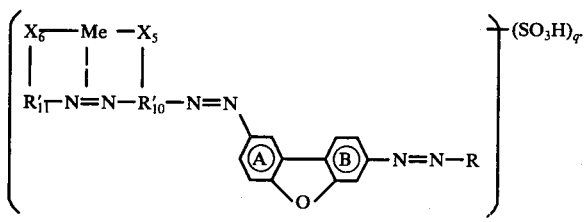

in which
R'$_{10}$ and R'$_{11}$ signify the radical of a coupling component of the benzene, pyrazolone-5, aminopyrazole, naphthalene or acetoacetylamino series, X$_5$ and X$_6$ signify —NH—R$_{10}$, —O— or —COO—, and are preferably in ortho positions to the azo group, and Me is a metal atom such as copper, nickel, iron, cobalt, manganese or chromium, or of the formula

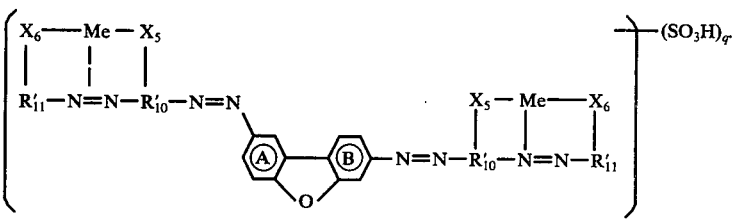

or of the formula:

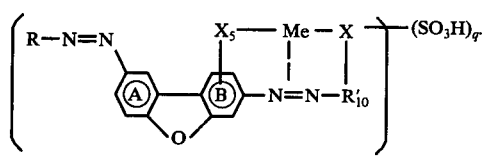

or of the formula:

in which the aromatic rings Z$_8$ and/or Z$_9$ and/or Z$_{10}$ may be further substituted. Me preferably signifies Cu.

By analogy all the compounds of the formulae LXXIV to LXXIX may be of similar structure to those of the formulae II or VII or XVI to XXI in respect of their asymmetric structure and the position of the —SO$_3$H groups in the molecule.

Preferred polyazo compounds correspond mainly to the formula:

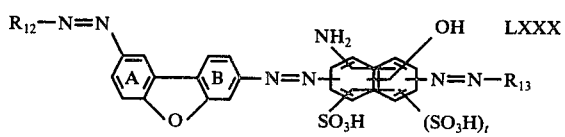

in which R$_{12}$ signifies the radical of a coupling component of the benzene, pyrazolone-5, aminopyrazole or naphthalene series, R$_{13}$ signifies the radical of a diazo or coupling component of the benzene or naphthalene series, and t signifies 0 or 1.

Examples of R$_{12}$ are hydroxy- and dihydroxybenzene and amino- and diamine-benzene.

Examples of R$_{13}$ are aminobenzenesulphonic acid, aminonaphthalenesulphonic acid, etc.

Suitable coupling components, such aS R, R$_1$, R$_2$, R'$_2$, R', R'$_{10}$, R'$_{11}$, R$_{12}$ and R$_{13}$, are those of the aromatic series, e.g. those of the benzene or naphthalene series carrying a substituent which makes the coupling possible. They belong for instance to the aminobenzene, hydroxybenzene, aminonaphthalene or hydroxynaphthalene series. Coupling components of the heterocyclic series may be employed too, such as those of the pyrazole (e.g. the pyrazolone-5 or aminopyrazole series), quinoline, hydroxyquinoline, barbituric acid, indole or carbazole series. Equally suited are coupling components with a methylene group capable of further coupling; and for example acylacetylamino compounds like acylacetylaminoalkyl or aryl compounds.

Examples of suitable coupling components are:
alkylphenols,
1,3-dihydroxybenzene,
2-hydroxynaphthalene,
1-hydroxy-4-alkoxynaphthalenes,
2-hydroxy-8-acetylamino-6-methylsulphonylaminonaphthalene,
1-hydroxy-6- and 7-aminonaphthalene,
1-hydroxy-6- and 7-methylaminonaphthalene,
1-hydroxg-6- and 7-phenylaminonaphthalene,
1-hydroxy-(4'-methoxyphenylamino)-naphthalene,
1-hydroxy-(2',4 ',6'-trimethylphenylamino)naphthalene, etc.

Aromatic coupling components with a primary or secondary amino group, such as aminobenzene and its derivatives, e.g.,
1,3-diaminobenzene,
1-aminonaphthalene,
2-aminonaphthalene,
2-phenylaminonaphthalene,
2-methylamino-5-hydroxynaphthalene,
2-hydroxynaphthalenesulfonic sulphonic acids such as
2-hydroxynaphthalene-4-, 5-, 6-, 7- or 8-. sulphonic acid; 2-hydroxynaphthalenesulfonic acids disulphonic acid such as 2-hydroxynaphthalene-4,6-, 4,7-, 4,8-, 5,8-, and 6,8- disulphonic acids, 2-amino-8-hydroxynaphthalene-6-sulphonic acid, 1-aminonaphthalene-4-sulphonic acid, 1-hydroxynapthalene-3,6- disulphonic acid; 1-hydroxynaphthalene trisulphonic acids such as 1-hydroxynaphthalene-3,6,8-trisulphonic acid.

Heterocyclic components are for instance 1-phenyl-3-methylpyrazolone-5,
1-(sulphophenyl)-3-methylpyrazolone
1-chlorophenyl)-3-methylpyrazolone-5,
1-(cyanophenyl)-3-methylpyrazolone-5,
1-(3'-halophenyl)-3-methylpyrazo lone-5,
1-(3'-cyanophenyl)-3-methylpyrazolone-5,
1-(alkylphenyl)-3-methylpyrazolone-5, and
1-(di- or trialkylphenyl)-3-methylpyrazolone 5

Aliphatic coupling components with an active methylene group are for example:
1-acetoacetylarylamides like
1-acetoacetylaminobenzene etc.,
1-acetoacetylamino-2-ethylhexane, 1-acetoacetylaminobutane etc.

The coupling components and all radicals of aromatic character may be substituted by substituents usual in dyestuffs chemistry, e.g. by halogen atoms, nitro and amino such as primary, secondary or tertiary amino, cyano, thiocyano, hydroxyl, alkyl, alkoxy, trifluoroalkyl, trichloroalkyl, mercapto, alkyl- or phenylmercapto, phenyl, cycloalkyl, phenoxy, alkylamino, dialkylamino, phenylamino, acyl, acyloxy, —COOH, —SO$_3$H; acylamino and sulphonarylamide groups like acetylamino, benzoylamino, alkylsulphonyl, arylsulphonyl, sulphonamide, sulphonalkylamide, sulphondialkylamide; arylazo such as phenylazo, diphenylazo etc,. Preferred acyl groups correspond to the formula R$_{14}$—Y$_1$ or R$_{14}$'—Z—, in which R$_{14}$ is a hydrocarbon radical substituted as required, carrying the substituents listed above and/or containing hereto atoms, preferably an alkyl or phenyl radical substituted as required, most preferably unsubstituted C$_{1-4}$alkyl or phenyl.

Y$_1$ is a radical of the formula —O—CO—, —SO$_2$— or —O —SO$_2$—, R$_{14}$'is a hydrogen atom or has one of the significances of R$_{14}$.

Z is a radical of the formula —CO—, —NR$_{14}$"—CO- or —NR$_{14}$"—SO$_2$— and R$_{14}$" denotes a hydrogen atom or one of the significances of R$_{14}$.

Halogen stands for bromine, fluorine or iodine, though in particular for chlorine.

Preferred salt forms of the compounds of formula I are the alkali metal, e.g. sodium potassium and lithium salt forms, the ammonium salt forms and the mono-, di- and tri-C$_{1-4}$-alkyl- and C$_{1-4}$hydroxyalkylammonium salt forms. The most preferred such forms being the alkali metal and ammonium salt forms, particularly the sodium salt forms.

Hydrocarbon radicals denote alkyl, aryl or cycloalkyl radicals mainly. Alkyl radicals may have 1 to 18, 1 to 12, though preferably 1 to 6, carbon atoms; preferably also they denote alkyl radicals of low molecular weight with 1, 2, 3 or 4 carbon atoms. Aryl or arylene radicals stand chiefly for phenyl or naphthyl radicals, or else phenylene or naphthylene radicals capable of carrying the above-named substituents. Cycloalkyl radicals are preferably 5- or 6-link ring systems though more preferably cyclohexyl radicals which may be substituted by alkyl, alkoxy or halogen as necessary.

Alkoxy radicals contain preferably 1, 2, 3 or 4 carbon atoms in the alkyl radical. As examples of bivalent links, e.g. X and X$_1$, may be given unsubstituted or substituted C$_{1-12}$alkylene or arylene radicals, which former radicals may be preceded, interrupted or followed by a hetero atom or group containing hetero atoms, e.g. by

—O—, —S—, or —N (R$_{10}$)— where R$_{10}$ is as defined above preferably hydrogen or C$_{1-4}$alkyl.

Preferred substituents in the aromatic rings Z$_1$ to Z$_{10}$ are for example halogen, alkyl or alkoxy.

These rings Z$_1$ to Z$_{10}$ may also have a —CH=•CH—CH=—CH=CH—CH=CH— groups condensed thereon.

the compounds provided by the present invention which are of particular interest may be represented by formula IA,

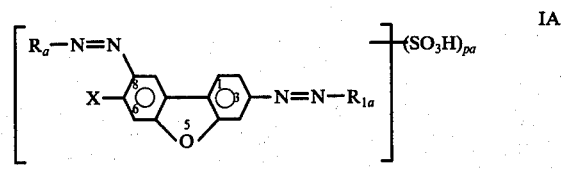

in which Ra and R$_{1a}$ are different and each
signifies a coupling component of the benzene, naphthalene, pyrazolone-5 or aminopyrazole series or an acetoacetylamino radical,
X signifies hydrogen or —SO$_3$H, and
pa signifies 1, 2, 3 or 4,
the compounds optionally bearing metallised or fibre reactive groups and being in free acid or salt form.

As a first class compounds falling within the general formula IA, may be given the compounds of formula IAa,

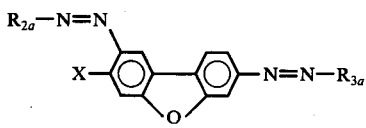  IAa in which X is as defined above, and
R$_{2a}$ and R$_{3a}$, which are different, either each signifies a radical selected from those of formulae (a), (b), (c) and (d),

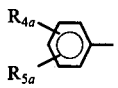  (a)

in which
R$_{4a}$ signifies hydrogen, hydroxy, —SO$_3$H or a group of the formula

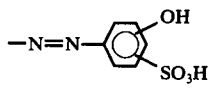

and
R$_{5a}$ signifies hydroxy, amino, carboxyl, N,N-di(C$_{1-4}$)alkylamino, N-(C$_{1-4}$)-alkyl-N-(C$_{1-4}$)alkylphenylamino, N-(C$_{1-4}$)alkyl-N-(C$_{1-4}$)alkylphenylaminosulphonyl, N-phenylamino, N-(C$_{1-4}$)alkylamino or N-(C$_{1-4}$)alkyl-N-benzylamino,

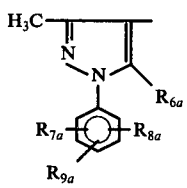  (b)

in which
R$_{6a}$ signifies —NH$_2$ or —OH,
R$_{7a}$ and R$_{8a}$, independently, signify hydrogen, C$_{1-4}$alkyl, halogen or —SO$_3$H, and
R$_{9a}$ signifies hydrogen, C$_{1-4}$alkyl, halogen or cyano,

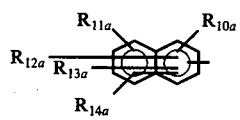  (c)

in which
R$_{10a}$ signifies —OH, —NH$_2$ or acetylamino,
R$_{11a}$ signifies hydrogen, carboxyl or —OH,
R$_{12a}$ signifies hydrogen, —SO$_3$H, C$_{1-4}$alkyl, C$_{1-4}$alkylsulphonyl, C$_{1-4}$alkoxy, C$_{1-4}$-alkylamino, phenylamino, C$_{1-4}$-alkoxyphenylamino or trimethylphenylamino, and
R$_{13a}$ and R$_{14a}$, independently, signify hydrogen or —SO$_3$H,

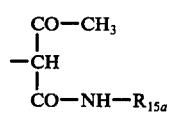  (d)

in which

R$_{15a}$ signifies 2-ethylhexyl, butyl, C$_{1-4}$-(alkyl)phenyl, C$_{1-4}$-alkoxyphenyl, di-(C$_{1-4}$)alkoxyphenyl, phenyl or disulfonaphthyl or one of R$_{2a}$ and R$_{3a}$ signifies a radical selected from the following formulae (e), (f), (g), (h) and (i), the other signifying a radical of the above formulae (a), (b), (c) and (d),

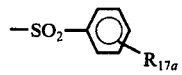  (e)

in which
R$_{16a}$ signifies C$_{1-4}$-alkyl or

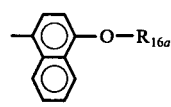

in which
R$_{17a}$ signifies hydrogen or C$_{1-4}$alkyl, and
R$_{18a}$ signifies hydrogen or C$_{1-4}$alkyl,

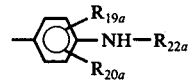  (f)

in which R$_{16a}$ is as defined above,

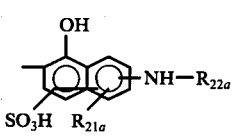  (g)

in which
R$_{19a}$ signifies hydrogen or C$_{1-4}$-alkyl
R$_{20a}$ signifies hydrogen, halogen, C$_{1-4}$alkyl or C$_{1-4}$alkoxy, and
R$_{22a}$ signifies a 4,6-dichloro-1,3,5-triazinyl-2; 2,6-dichloropyrimidyl-4; 2,5,6-trichloropyrimidyl-4; 4-chloro-6-(4'-sulphophenylamino)-1,3,5-triazinyl-2; 4-chloro-6-(phenylamino)1,3,5-triazinyl-2 or 5-chloro-2,6-difluoropyrimidyl-4radical, (h)

in which
R$_{22a}$ is as defined above, and
R$_{21a}$ signifies hydrogen or —SO$_3$H, (i)

in which R$_{22a}$ is as defined above, or R$_{2a}$ signifies a radical of formula (a), above, and R$_{3a}$ signifies a radical of formula (j),

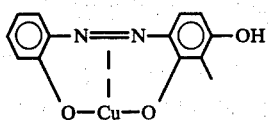                                                        (j)

the compounds of formula IAa containing 2, 3, or 4 sulphonic acid groups and being in free acid or salt form.

As will be appreciated, the radicals of formula (a) and (c) should contain groups enabling coupling to take place.

In the compounds of formula IAa, the preferred radicals of formula (a) are of formulae (a¹) and (a²),

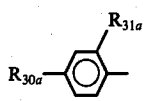                                               (a¹)

in which
  $R_{30a}$ signifies carboxyl, hydroxyl, N-($C_{1-4}$)alkyl-N-($C_{1-4}$)alkylphenylaminosulphonyl, N,N-di($C_{1-4}$)alkylamino, N-mono-($C_{1-4}$)-alkylamino, N-phenylamino, N-($C_{1-4}$)alkyl-N-benzylamino or

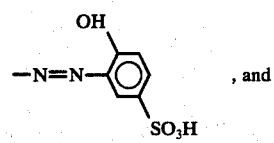 , and and
  $R_{31a}$ signfifies hydrogen or hydroxyl,
with the proviso that where $R_{30a}$ signifies 2-hydroxy-5-sulphophenylazo, $R_{31a}$ signifies hydroxyl,

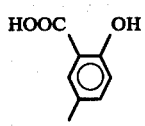                                                (a²), the preferred radicials of formula (b) being of formula (b¹)

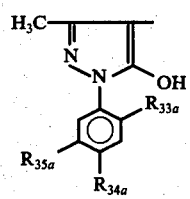                                               (b¹)

in which
  $R_{33a}$ and $R_{35a}$, independently, signify hydrogen or chlorine, and
  $R_{34a}$ signifies hydrogen, —$SO_3H$ or chlorine,
the preferred radicals of formula (c) being of formula (c¹)

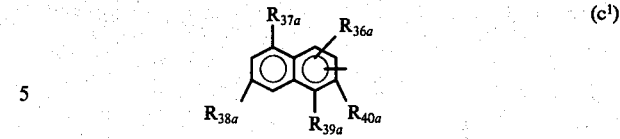                                               (c¹)

in which
  $R_{36a}$ signifies +OH, —$NH_2$ or acetylamino,
  $R_{37a}$ signifies hydrogen, hydroxyl, carboxy or —$SO_3H$, and
  $R_{38a}$, $R_{39a}$ and $R_{40a}$, independently, signify hydrogen or —$SO_3H$,
the radical of formula (c¹) containing from 1 to 3 —$SO_3H$ groups, the preferred radicals of formula (d) being of formula (d¹), $$\begin{array}{c} CO-CH_3 \\ | \\ CH- \\ | \\ CO-NH-R_{41a} \end{array} \qquad (d^1)$$

in which
  $R_{41a}$ signifies phenyl, dimethoxyphenyl, methyl- or methoxyphenyl, 2-ethylhexyl or disulfonaphthyl,
the preferred radicals of formula (e) being of formula (e¹)

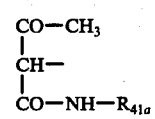                                               (e¹)

in which
  $R_{42a}$ signifies methyl, ethyl, phenylsulphonyl or p-methylphenylsulphonyl, and
  $R_{43a}$ signifies hydrogen or methyl, the preferred radicals of formula (f) being of formula (f¹)

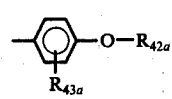                                               (f¹)

in which $R_{42a}$ is as defined above, the preferred radicals of formula (g) being of formula (g¹),

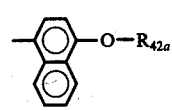                                               (g¹)

in which
  $R_{22a}$ is as defined above,
  $R_{44a}$ signifies hydrogen, methyl, chlorine or methoxy, and
  $R_{45a}$ signifies hydrogen or methyl, the preferred radicals of formula (h) being of formula (h¹)

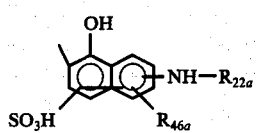                                              (h¹)

in which $R_{22a}$ is as defined above, and $R_{46a}$ signifies hydrogen or —$SO_3H$, and the preferred radicals of formula (i) being of formula (i¹),

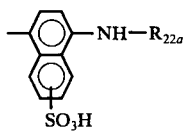 (i¹)

in which $R_{22a}$ is as defined above.

As will be appreciated, the radicals of formula (a') and (c') should contain groups enabling coupling to take place.

In the compounds of formula IAa, X preferably signifies hydrogen.

One group of interesting compounds of Formula IAa are those wherein one of $R_{2a}$ and $R_{3a}$ is a group of formula (g), (h) or (i) and the other is a group of formula (a), (b), (c) or (d). The preferred compounds of this group are those wherein any group of formula (g) is a group of formula (g¹), any group of formula (h) is a group of formula (h¹) and any group of formula (i) is a group of formula (l¹).

The most preferred compounds of formula IAa are those wherein X signifies hydrogen, $R_{2a}$ signifies a radical of formula (e¹), (f¹), (g¹), (h¹) or (i¹) and $R_{3a}$ signifies (a¹), (a²), (b¹), (c¹) or (d¹) or $R_{2a}$ signifies a radical of formula (a¹), (a²), (b¹), (c¹) or (d¹) and $R_{3a}$ signifies a radical of formula (e¹), (f¹), (g¹), (h¹) or (i¹) or $R_{2a}$ signifies a radical of formula (a¹) and $R_{3a}$ signifies a radical of formula (j).

As a second class of compounds falling within the general formula IA, may be given the compounds of formula IAb,

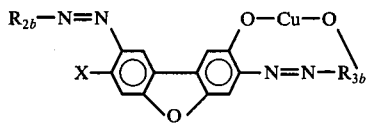 IAb in which

X signifies hydrogen or -$SO_3H$, $R_{2b}$ signifies a radical of formula (e) or (f) above, preferably of formula (e¹) or (f¹), above, and $R_{3b}$ signifies a radical of formula (k), (l) or (m),

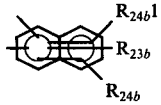 (k)

in which $R_{23b}$, $R_{24b}$ and $R_{24b}1$, independently, signify hydrogen or -$SO_3H$, and in which, of the two free bonds, one is in α-position, and the other in adjacent β-position thereto,

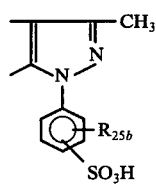 (l)

in which $R_{25b}$ signifies hydrogen or —$SO_3H$,

 (m)

in which $R_{27b}$ signifies hydrogen or $C_{1-4}$alkyl, the compounds of formula IAb containing 2, 3 or 4 sulphonic acid groups and being in free acid or salt form.

The preferred compounds of formula IAb are those in which $R_{2b}$ signifies a radical of formula (e¹) or (f¹) and $R_{3b}$ signifies a radical of formula (k¹) or (l¹),

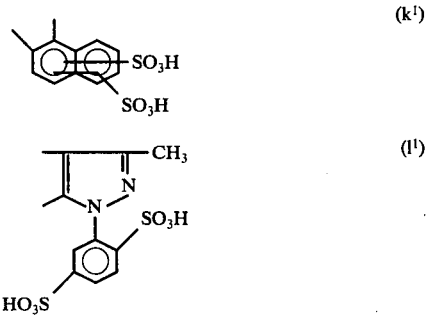

As a third class of compounds falling within the general formula IA, may be given the compounds of formula IAc,

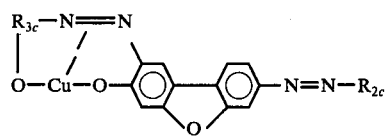 IAc ps in which $R_{2c}$ signifies a radical of formula (e) or (f), above, preferably of formula (e¹) or (f¹), above, and $R_{3c}$ signifies a radical of formula (k), (l) or (m), above, preferably of formula (k¹) or (l¹), above, the compounds of formula IAc containing 2, 3 or 4 sulphonic acid groups and being in free acid or salt form.

As a fourth class of compounds falling within the general formula IA, may be given the compounds of formula IAd,

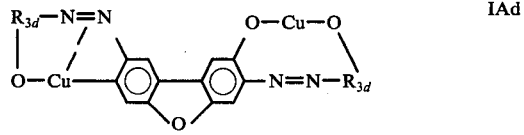 IAd in which the $R_{3d}$'s, which are different, each signifies a radical of formula (k), (l) or (m), above, the compounds of formula IAd containing 2, 3 or 4 sulphonic acid groups and being in free acid or salt form.

The invention also provides a process for the production of compounds of formula I, which comprises coupling a tetrazo compound from a diamine of formula Ia

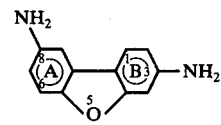 Ia in which rings A and B are as defined above, with a coupling component of formula Ib,

    Ib in which R is as defined above, and with a coupling component of formula Ic,

    Ic in which R₁ is as defined above.

It will be clear that the various preferred azo compounds described hereinbefore may be prepared by coupling the appropriate starting materials. It will also be clear that once the basic dye structure is formed according to the invention, it may be modified in conventional manner.

Thus, for example, the azo compounds of formula VI or VII may be obtained by etherifying or acylating, e.g. tosylating, a compound of the formula:

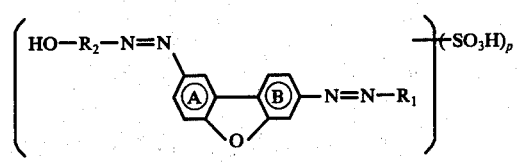    VIa or a compound of the formula:

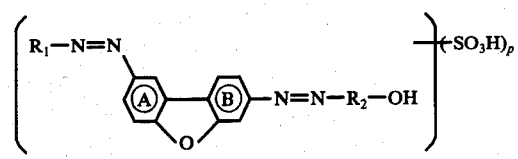    VIIa

The azo compounds of formula XII may be obtained by etherifying or acylating, e.g. tosylating, a compound of the formula:

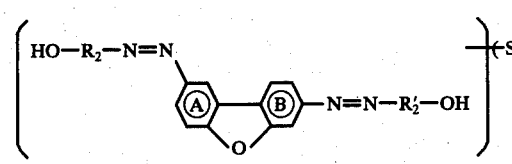    XIIa

The azo compounds of formula XV can be obtained by coupling the diazo compound from an amino compound of the formula:

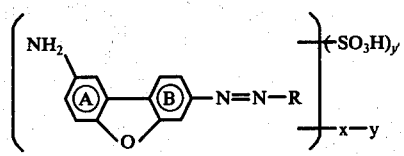    XVa in which y' may signify t, v or w, with a coupling component of the formula:

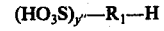

in which y' and y" total 2 to 4.

The azo compounds of formula XV can also be obtained by reacting a compound of the formula:

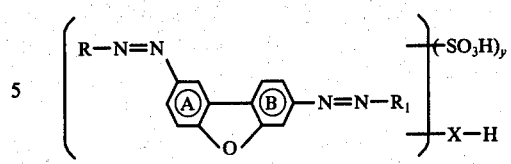    XVb with a compound which will provide a fibre-reactive radical.

It is also clearly possible to employ compounds of formula Ia which are substituted by the SO₃H group, such as the diamine of the formula:

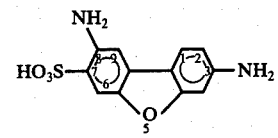

Such intermediates are known or may be prepared in conventional manner from known starting materials.

The coupling reaction may be effected in conventional manner. It is preferred to effect a first coupling in water at a pH of 6 to 8 and temperatures from −10° to +20° C, more preferably at 5° to 10° and suitably in the presence of a coupling accelerator like pyridine, urea, etc. The coupling of the resulting compound with the second coupling component is also effected in water usually, at at a pH from 9 to 12, preferably between 10 and 11, at temperatures from −10° to +20° C, preferably from 10° to 20°. The usual coupling accelerators may be used for this coupling reaction too.

Acylation or tosylating is also effected in conventional manner and may be effected in water at at a pH of 8 - 10, preferably around 9, and at temperatures from 30° to 80° C, e.g. around 50° C, working preferably in the presence of sodium carbonate or disodium phosphate. A neutral solvent may be added too, such as dichlorobenzene.

Etherification, e.g. with dimethyl or diethyl sulphate, is effected mainly in water with a pH- of 8 to 10 and temperatures of 30° to 80° C, preferably 40° - 60° C and in the presence of, for instance, sodium or potassium carbonate or bicarbonate.

The introduction of a reactive component, i.e. transposition of the hydrogen atom of a free —OH or free amino group with the halogen atom or a sulphate group of a reactive component, can likewise be effected in water with a pH- of 5 to 7 and at temperatures from 20° to 40° C, chiefly in the presence of sodium acetate or sodium bicarbonate.

Metallization is generally performed in water at a pH- of 9 to 12 and at temperatures from 40° C to boiling point, preferably at 50° - 80° C and in the presence of sodium hydroxide. Metallization is preferably effected with metal-donating agents, such as those donating chromium, iron, cobalt, copper, manganese or nickel. Copper-donating compounds include, for example, copper acetate, chloride and formate; nickel-donating compounds include nickel formate, acetate and sulphate; chromium-donating compounds are chromium trioxide, fluoride, sulphate, formate, and acetate and, chromium ammonium sulphate; sodium chromate or bichromate may be employed as well. Typical manganese-, cobalt- or iron-donating compounds are manganese, cobalt or iron formate, acetate or sulphate.

The compounds are highly coloured and are indicated for dyeing or printing natural or synthetic polyamides, like wool, silk and nylon, cotton, mordanted cotton, cellulosic fibres or regenerated cellulose fibres, basically modified polypropylene fibres, synthetic polyamides or polyesters modified by acid groups, as well as paper and leather. The polyazo compounds are particularly indicated for dyeing or printing leather.

The anionic compounds of formula I and their metal complexes have generally good light- and wet-fastness on the substrates named above, also good fastness to washing, milling and potting, water, perspiration, abrasion and sea water. The substrates are dyed in brilliant, level tones with good migration. They have a good neutral affinity and build-up capability, and cover stripily dyeing nylon fabric. They have good substantivity on cotton and paper. In addition they have good fastness to solvents, acids and alkalis.

Natural and synthetic polyamides and cellulose fibres dyed with the compounds of formula I which are reactive dyestuffs, possess good light-fastness and good resistance to water, sea water, milling and perspiration. Their fixation capacity is also very good.

The compounds may be used for dyeing or printing using methods conventional for the broad class of dyestuff and appropriate for the particular substrate.

An important group of dyestuffs - the so-called benzidine dyestuffs, i.e. those derived from benzidine - has been withdrawn from the market because of the danger to health, or the cessation of the production of these dyestuffs is being considered. Consequently, there is a real need to replace this valuable group of dyestuffs by others of similar type and shading. The compounds of the present invention are not derived from benzidine, and it is thought that their production will be less dangerous.

In the examples that follow, the parts are parts by weight, the percentages are percentages by weight, and the temperatures are given in degrees Centigrade.

EXAMPLE 1

19.8 parts of 3,8-diaminodibenzofuran are suspended in 150 parts water and 25 parts hydrochloric acid at 0° - 2°. Then a solution consisting of 14 parts sodium nitrate in 60 parts water is dropped into the suspension, keeping the temperature between 0° and 5°.

After 30 minutes a solution consisting of 22.4 parts 2-hydroxynaphthalene-8-sulphonic acid, 8 parts sodium carbonate and 200 parts water is dropped into the tetrazo solution. The coupling mass is stirred for 2 hours at 0° - 5°. After this a solution consisting of 25.4 parts 1-(4'-sulfophenyl)-3-methyl-5-pyrazolone, 30 parts of a 30% aqueous sodium hydroxide solution and 100 parts water is added to the coupling mass. The coupling mixture is stirred for 4 hours, during which the temperature may be allowed to rise to room temperature. The pH of the suspension is adjusted to 7, after which the dyestuff precipitated is removed by suction, washed with an aqueous sodium chloride solution and dried at 100°. The dyestuff will dye natural and synthetic polyamides from neutral to weakly acid bath to a pure orange shade with good wet- and light-fastness. The dyestuff of the formula:

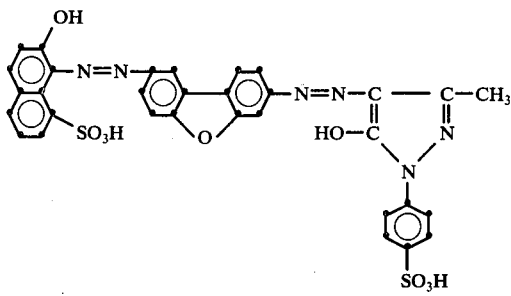

will also dye cotton, paper and leather with good fastnesses.

EXAMPLE 2

If the tetrazotized 3,8-diaminodibenzofuran is coupled first onto 1-(4'-sulfophenyl)-3-methyl-5-pyrazolone and then onto 2-hydroxynaphthalene-8-sulphonic acid under the reaction conditions described in Example 1, an isomer dyestuff is obtained with the formula:

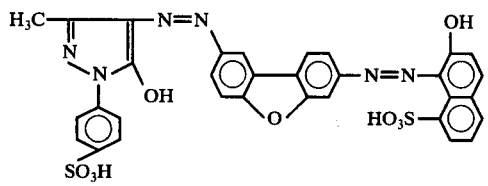

The dyestuff will dye natural and synthetic polyamide from neutral to weakly acid bath to a pure scarlet tone with the same good wet- and light-fastness as the dyestuff described in Example 1.

In Table I that follows, the structure of further dyestuffs is given. These can be produced by the method indicated in Example 1, and correspond to the formula:

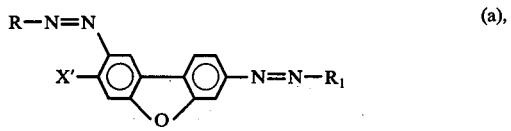

In the columns for R, $R_1$ and X' the initial compound and radicals for producing the dyestuff (a) are given. A further column I gives the dyeing shade on synthetic polyamide (nylon), cellulose and leather.

Table I

| No. | Coupling component R | X' | Coupling component $R_1$ | I |
|---|---|---|---|---|
| 3 | 2-hydroxynaphthalene-8-sulphonic acid (4) | H | 1-phenyl-3-methyl-5-pyrazolone (4) | orange |
| 4 | " | " | 1-(4'-chloro)-phenyl-3-methyl-5-pyrazolone (4) | orange |
| 5 | 1-(2',5'-dichloro-4'-sulpho)-phenyl-3-methyl-5-pyrazolone (4) | " | 2-hydroxynaphthalene-8-sulphonic acid (1) | orange |
| 6 | 2-hydroxynaphthalene | " | 2-hydroxynaphthalene | scarlet |

Table I-continued

| No. | Coupling component R | X' | Coupling component R₁ | I |
|---|---|---|---|---|
| | -6,8-disulphonic acid (1) | | (1) | |
| 7 | " | " | 1-hydroxynaphthalene (2) | scarlet |
| 8 | 1-hydroxynaphthalene-3,6-disulphonic acid (2) | " | " | red |
| 9 | 1-hydroxynaphthalene-3,6-disulphonic acid (2) | H | 1-phenyl-3-methyl-5-pyrazolone (4) | orange |
| 10 | 2-amino-8-hydroxynaphthalene-6-sulphonic acid (acid-coupled) (1) | " | 1-hydroxynaphthalene-4-sulphonic acid (2) | red |
| 11 | 1-aminonaphthalene-4-sulphonic acid (2) | " | " | orange |
| 12 | 1-phenyl-3-methyl-5-aminopyrazole (4) | " | 1-amino-8-hydroxynaphthalene-3,6-disulphonic acid (alkaline-coupled) (7) | red |
| 13 | " | " | 1-amino-8-hydroxynaphthalene-4,6-disulphonic acid (alkaline-coupled) (7) | red |
| 14 | N-ethyl-N-benzylaniline-3'-sulphonic acid (4) | H | 2-hydroxynaphthalene-6-sulphonic acid (1) | red |
| 15 | n,n-diethylaniline (4) | H | " | red |
| 16 | N-methylaniline (4) | H | 1-hydroxynaphthalene-3-sulphonic acid (2) | red |
| 17 | N-phenylaniline | H | " | red |
| 18 | N-ethyl-N-benzylaniline-3'-sulphonic acid (4) | H | 2-hydroxybenzoic acid (5) | red |
| 19 | " | $SO_3H$ | " | red |
| 20 | 1-hydroxynaphthalene-3,6-disulphonic acid (2) | " | 1-phenyl-3-methyl-5-pyrazolone (4) | red |
| 21 | 2-hydroxynaphthalene-6-sulphonic acid (1) | " | " | red |
| 22 | 2-hydroxynaphthalene-8-sulphonic acid (1) | H | 1-(4'-sulpho)-phenyl-3-methyl-5-pyrazolone (4) | red |
| 23 | 2-hydroxynaphthalene-8-sulphonic acid (1) | $SO_3H$ | 2-hydroxynaphthalene (1) | red |
| 24 | 1-(4'-sulfophenyl-3-methyl-5-pyrazolone (4) | " | 2-hydroxynaphthalene-8-sulphonic acid (1) | red |
| 25 | N-ethyl-N-benzylaniline (4) | " | 2-hydroxynaphthalene (1) | red |
| 26 | " | " | 1-hydroxynaphthalene (2) | red |
| 27 | " | " | 2-hydroxynaphthalene-8-sulphonic acid (1) | red |
| 28 | N-ethyl-N-benzylaniline-3'-sulphonic acid (4) | " | 1-hydroxynaphthalene (2) | red |
| 29 | 1-acetoacetylamino-2,5-dimethoxybenzene (CH₂) | " | 2-hydroxynaphthalene-8-sulphonic acid (1) | orange |
| 30 | Acetoacetylaminobenzene (CH₂) | " | " | orange |
| 31 | Acetoacetic acid-o-anisidide (CH₂) | $SO_3H$ | 2-hydroxynaphthalene-8-sulphonic acid (1) | orange |
| 32 | 1-acetoacetylamino-2-ethylhexane (CH₂) | " | " | orange |
| 33 | 1-(4'-sulfophenyl-3-methyl-5-pyrazolone (4) | " | Acetoacetylaminobenzene (CH₂) | yellow |
| 34 | N-ethyl-N-benzylaniline (4) | " | 1-hydroxynaphthalene-3-sulphonic acid (2) | red with bluish tinge |
| 35 | 1-hydroxynaphthalene-3,6-trisulphonic acid (2) | H | 1-phenyl-3-methyl-5-pyrazolone (4) | orange |
| 36 | 2-hydroxynaphthalene-3,6,8-trisulphonic acid (1) | H | " | orange |
| 37 | 2-amino-8-hydroxynaphthalene-6-sulphonic acid (acid coupling) (1) | H | 2-hydroxybenzoic acid (5) | red |
| 38 | 1-phenyl-3-methyl-5-pyrazolone-4'-sulphonic acid (4) | H | 2-hydroxybenzene-1-carboxylic acid (5) | orange |
| 39 | 2,4,2'-trihydroxyazobenzene-5'-sulphonic acid (3) | H | " | brown |
| 40 | 1-amino-8-hydroxynaphthalene 3,6-disulphonic acid (7) | H | 2-amino-8-hydroxynaphthalene-6-sulphonic acid (7) | blue-black |
| 41 | 1-phenyl-3-methyl-5-pyrazolone (4) | H | 1-hydroxynaphthalene-3,6,8-trisulphonic acid (2) | orange |
| 42 | " | H | 2-hydroxynaphthalene-3,6,8-trisulphonic acid | orange |
| 43 | 1-(4'-sulfophenyl)- | H | 1-(4'-sulfophenyl)-3- | yellow |

Table I-continued

| No. | Coupling component R | X' | Coupling component $R_1$ | I |
|---|---|---|---|---|
|  | 3-methyl-5-aminopyrazole (4) |  | methyl-5-pyrazolone (4) |  |
| 44 | N-ethyl-benzylaniline -3'-sulphonic acid (4) | H | 1-(4'-sulfophenyl) 3-methyl-5-pyrazolone (4) | yellow |
| 45 | 2-hydroxynaphthalene -8-sulphonic acid (1) | H | 1-(2',5'-dichloro-4'-sulfo) phenyl-3-methyl-5-pyrazolone (4) | orange |
| 46 | 2-hydroxynaphthalene (1) | H | " | orange |
| 47 | " | H | 2-hydroxynaphthalene-6,8-disulphonic acid (1) | scarlet |
| 48 | 1-phenyl-3-methyl-5-pyrazolone (4) | H | " | yellow |
| 49 | " | H | 2-hydroxynaphthalene-8-sulphonic acid (1) | yellow |
| 50 | " | $SO_3H$ | " | yellow |
| 51 | " | " | 1-hydroxynaphthalene-3-sulphonic acid (2) | scarlet |
| 52 | 1-phenyl-3-methyl-5-pyrazolone (4) | $SO_3H$ | 2-hydroxynaphthalene-6-sulphonic acid (1) | yellow |
| 53 | " | H | 1-amino-8-hydroxynaphthalene-3,6-disulphonic acid (alkaline-coupled) (7) | red with bluish tinge |
| 54 | " | H | 1-acetylamino-8-hydroxynaphthalene-3,6-disulphonic acid (alkaline-coupled) (7) | " |
| 54a | 2-hydroxynaphthalene -8-sulphonic acid (1) | H | N-ethyl-N-ethyl phenyl-aniline-3'-sulphonic acid (4) | scarlet |
| 54b | 2-hydroxybenzene-1-carboxylic acid (5) | H | 1-phenyl-3-methyl-pyrazolone-5-(4'-sulphonic acid) (4) | " |

EXAMPLE 55

31 Parts of 2-hydroxynaphthalene-6,8-disulphonic acid are dissolved in 500 parts water, adding 15 parts sodium carbonate. This solution is dropped into the tetrazo solution produced as in Example 1. After stirring for 5 hours at 0° – 5° a solution consisting of 9.5 parts phenol, 25 parts sodium carbonate and 200 parts water is added to the coupling mass. The coupling mixture is stirred for 4 hours, during which the temperature may rise to room temperature. After an intermediate isolation the disazo compound is stirred into 800 parts of water adding 30 parts sodium carbonate, heated to 50°, and portions of benzenesulphonyl chloride are stirred in at this temperature. When no more of the original substance can be detected in the thin-layer chromatogram, the suspension is cooled to 20°, filtered, washed with a 2% aqueous sodium chloride solution and dried at 100°. The product will dye natural and synthetic polyamides to a pure scarlet tone with good wet-, alkali-, light- and milling fastness. The dyestuff of the formula

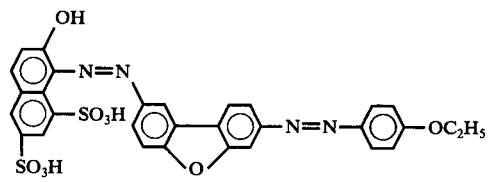

dyes cotton, paper and leather with good fastness.

EXAMPLE 56

The free hydroxy group of the disazo dyestuff in Example 55 can also be transposed under the same conditions with diethyl sulphate instead of the benzenesulphonyl chloride. The dyestuff of formula

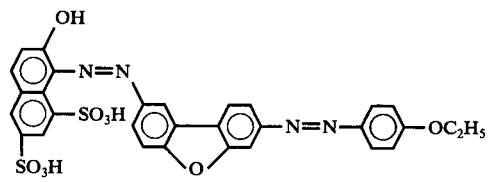

is obtained, which dyes natural and synthetic polyamides in to scarlet tones with good fastnesses. Table II gives the structures of further dyestuffs which can be produced according to the directions under Example 55.

They correspond to the formula

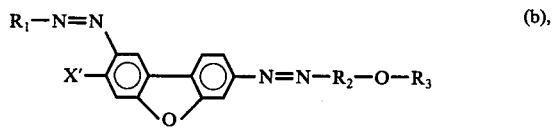

in which the initial compounds and radicals for producing the dyestuff (b) are given in the columns for $R_1$ and X'. Set out in the other columns are the radicals $R_2$ and $R_3$, and in a further column I is the dyeing shade on nylon, cellulose and leather.

Table II

| No. | Coupling component $R_1$ | X' | Radical $R_2$ | Radical $R_3$ | I |
|---|---|---|---|---|---|
| 57 | 2-hydroxynaphthalene-6,8-disulphonic acid (1) | H | —⟨O⟩— | —$SO_2$—⟨O⟩—$CH_3$ | scarlet |

Table II-continued

| No. | Coupling component R₁ | X' | Radical R₂ | Radical R₃ | I |
|---|---|---|---|---|---|
| 58 | " | H | " | —CH₃ | " |
| 59 | " | H | 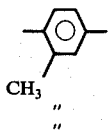 CH₃ | " | " |
| 60 | " | H | " | —C₂H₅ | " |
| 61 | " | H | " | —SO₂—⌬—CH₃ | " |
| 62 | 1-hydroxynaphthalene-3,6-disulphonic acid (2) | H | " | " | " |
| 63 | " | H | —⌬— | " | " |
| 64 | " | H | " | —C₂H₅ | " |
| 65 | " | H | " | —CH₃ | " |
| 66 | 1-hydroxynaphthalene-3-sulphonic acid (2) | H | " | —SO₂—⌬—CH₃ | " |
| 67 | " | SO₃H | " | " | " |
| 68 | " | " | " | —C₂H₅ | " |
| 69 | 2-hydroxynaphthalene-8-sulphonic acid (1) | SO₃H | —⌬— | —SO₂—⌬—CH₃ | " |
| 70 | " | " | " | —C₂H₅ | " |
| 71 | " | H | " | —SO₂—⌬—CH₃ | " |
| 72 | 1-(4'-sulfophenyl-3-methyl-5-pyrazolone (4) | H | " | " | yellow |
| 73 | 1-(2',5'-disulpho)-phenyl-3-methyl-5-pyrazolone (4) | H | " | " | " |
| 74 | " | H | " | —C₂H₅ | " |
| 75 | " | H | " | —CH₃ | " |
| 76 | " | H |  | —SO₂—⌬—CH₃ | orange |
| 77 | 1-phenyl-3-methyl-5-pyrazolone-3'-sulphonic acid (4) | SO₃H | —⌬— | " | yellow |
| 78 | 1-phenyl-3-methyl-5-aminopyrazole-4'-sulphonic acid (4) | " | " | " | " |
| 79 | N-ethyl-N-benzyl-aniline-3'-sulphonic acid (4) | " | " | " | " |
| 80 | " | " | " | —C₂H₅ | " |
| 81 | 2-amino-8-hydroxynaphthalene-6-sulphonic acid (1) | " | " | —SO₂—⌬—CH₃ | red |
| 82 | 2-acetoacetylamino-naphthalene-5,7-disulphonic acid (CH₂) | H | " | " | yellow |
| 83 | 2-aminonaphthalene-3,6-disulphonic acid (1) | H | " | " | orange |
| 84 | " | H | " | —C₂H₅ | " |
| 85 | " | H | " | —SO₂—⌬ | " |
| 86 | 1-hydroxynaphthalene-3,6,8-trisulphonic acid (2) | H | " | —SO₂—⌬—CH₃ | red |
| 87 | " | H | " | —C₂H₅ | " |
| 88 | 2-hydroxynaphthalene-3,6,8-trisulphonic acid (1) | H | " | " | scarlet |
| 89 | " | H | " | —SO₂—⌬—CH₃ | " |
| 90 | " | H | " | —SO₂—⌬ | " |
| 91 | 2-hydroxynaphthalene-3,6,8-trisulphonic acid (1) | H | " | —CH₃ | " |
| 92 | 1-hydroxynaphthalene-3,6,8-trisulphonic acid (2) | H | " | —SO₂—⌬ | " |

Table II-continued

| No. | Coupling component $R_1$ | X' | Radical $R_2$ | Radical $R_3$ | I |
|---|---|---|---|---|---|
| 92a | 1-hydroxynaphthalene-3,6-disulphonic acid (2) | H | naphthyl | $-SO_2-\phi-CH_3$ | " |

EXAMPLE 93

If the tetrazotized 3,8-diaminodibenzofuran is coupled first onto phenol and then onto 2-hydroxynaphthalene-6,8-disulphonic acid under the reaction conditions described under Example 55, after condensing the hydroxyazo dyestuff obtained with p-toluenesulphochloride a dyestuff is obtained with the formula:

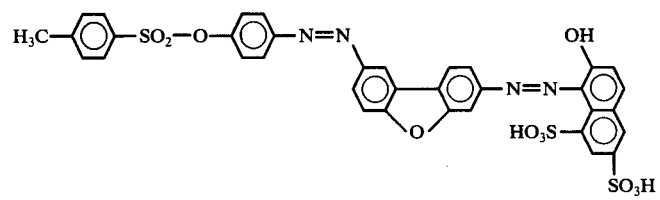

This dyestuff dyes natural and synthetic polyamides in pure scarlet tones with good fastnesses.

Listed in Table III are the structures of similar dyestuffs which can be produced following the directions given under Example 93. They correspond to the formula

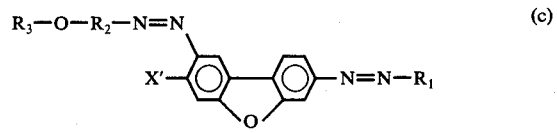

(c)

Table III

| No. | Coupling component $R_1$ | X' | Radical $R_2$ | Radical $R_3$ | I |
|---|---|---|---|---|---|
| 94 | 2-hydroxynaphthalene-6,8-disulphonic acid (1) | H | $-\phi-$ | $-SO_2-\phi$ | scarlet |
| 95 | " | H | " | $-CH_3$ | " |
| 96 | " | H | $-\phi(CH_3)-$ | " | " |
| 97 | " | H | " | $-C_2H_5$ | " |
| 98 | " | H | " | $-SO_2-\phi-CH_3$ | " |
| 99 | 1-hydroxynaphthalene-3,6-disulphonic acid (2) | H | " | " | " |
| 100 | " | H | $-\phi-$ | " | " |
| 101 | " | H | " | $-C_2H_5$ | " |
| 102 | " | H | " | $-CH_3$ | " |
| 103 | 1-hydroxynaphthalene-3-sulphonic acid (2) | H | " | $-SO_2-\phi-CH_3$ | " |
| 104 | " | $SO_3H$ | " | " | " |
| 105 | " | " | " | $-C_2H_5$ | " |
| 106 | 2-hydroxynaphthalene-8-sulphonic acid (1) | " | " | $-SO_2-\phi-CH_3$ | " |
| 107 | " | " | " | $-C_2H_5$ | " |
| 108 | 2-hydroxynaphthalene-8-sulphonic acid (1) | H | " | $-SO_2-\phi-CH_3$ | " |
| 109 | 1-(4'-sulfophenyl)-3-methyl-5-pyrazolone (4) | H | " | " | yellow |
| 110 | 1-(2',5'-disulpho)-phenyl-3-methyl-5-pyrazolone (4) | H | " | " | " |
| 111 | " | H | " | $-C_2H_5$ | " |
| 112 | " | H | " | $-CH_3$ | " |
| 113 | " | H | naphthyl | $-SO_2-\phi-CH_3$ | orange |

Table III-continued

| No. | Coupling component R₁ | X' | Radical R₂ | Radical R₃ | I |
|---|---|---|---|---|---|
| 114 | 1-phenyl-3-methyl-5-pyrazolone-3'-sulphonic acid (4) | SO₃H | —⟨O⟩— | " | yellow |
| 115 | 1-phenyl-3-methyl-5-aminopyrazole-4'-sulphonic acid (4) | " | " | " | " |
| 116 | N-ethyl-N-benzyl-aniline-3'-sulphonic acid (4) | " | " | " | " |
| 117 | " | " | " | —C₂H₅ | " |
| 118 | 2-amino-8-hydroxynaphthalene-6-sulphonic acid (1) | " | " | —SO₂—⟨O⟩—CH₃ | red |
| 119 | 2-acetoacetylamino-naphthalene-5,7-disulphonic acid (CH₂) | H | —⟨O⟩— | —SO₂—⟨O⟩—CH₃ | orange |

EXAMPLE 120

19.8 Parts of 3,8-diaminodibenzofuran are suspended in 150 parts water and 25 parts hydrochloric acid at 0° – 2°. Then a solution consisting of 14 parts sodium nitrate in 60 parts water is dropped into the suspension, keeping the temperature between 0° and 5°.

After 30 minutes a solution consisting of 13.7 parts para-cresidine, 100 parts acetone and 20 parts water is dropped into the tetrazo solution. After 3 hours of stirring at 0° – 5° the pH of the suspension is adjusted to 5 by adding 10 parts sodium acetate. After another hour, a solution consisting of 38.4 parts 1-hydroxynaphthalene-3,6,8-trisulphonic acid, 40 parts of a 30% aqueous sodium hydroxide solution and 100 parts water is added to the coupling mixture. The coupling mixture is stirred 4 hours, during which the temperature may rise to room temperature. The pH of the suspension is adjusted to 7, after which the precipitated product is removed by suction and washed with an aqueous sodium chloride solution.

Under intensive stirring a neutral solution of the aminodisazo compound obtained above is allowed to flow into 600 parts water at 0° and admixed with 18.4 parts of cyanuric chloride which have been suspended in 200 parts water and 200 parts ice. The pH of the reaction medium is kept between 3 and 4 during this by adding a 15% aqueous sodium carbonate solution. The condensation product is precipitated with sodium chloride, filtered off and purified with an aqueous sodium chloride solution. The dyestuff is dried under vacuum at 40° – 50°. In the milled state it is a brown powder, which dissolves in water to a scarlet colour. The dyestuff of the formula:

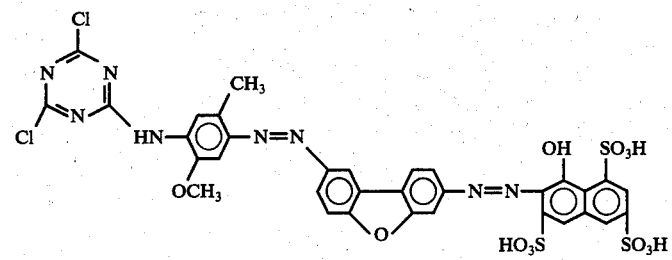

will dye cellulosic fibres to light-, wash-, water- and perspiration-fast shades, and wool, silk and synthetic polyamide to light-, wash-, water-, perspiration-, mill- and dry-cleaning-fast scarlet tones.

In the Table IV that follows are the structures of further dyestuffs which can be produced according to the directions under Example 120. The correspond to the formula:

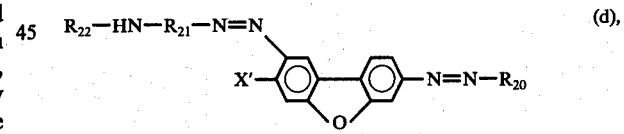

(d), in which the symbols R₂₀, R₂₁, X' and R₂₂ represent initial compounds or radicals employed to produce the azo compounds of formula (d) which are given in the appropriate columns of the table. The colour shade produced on cellulose and polyamide is indicated in a further column I.

Table IV

| No. | R₂₀ | X' | R₂₁ | R₂₂ | Colour shade on polyamide (I) |
|---|---|---|---|---|---|
| 121 | 1-hydroxynaphthalene-3,6-disulphonic acid (2) | H | —⟨O⟩— | 2,4,6-trichloro-1,3,5-triazine (2) | scarlet |
| 122 | " | H | —⟨O⟩—Cl | " | " |

Table IV-continued

| No. | $R_{20}$ | $X'$ | $R_{21}$ | $R_{22}$ | Colour shade on polyamide (I) |
|---|---|---|---|---|---|
| 123 | 2-hydroxynaphthalene-6,8-disulphonic acid (1) | H | " | " | " |
| 124 | " | H | " | 2,4,5,6-tetra-chloropyrimidine (4) | " |
| 125 | " | H | " | 5-chloro-2,4,6-trifluoropyrimidine (4) | " |
| 126 | " | H | 2,5-dimethoxy-4-methylphenyl (OCH₃, CH₃) | " | " |
| 127 | " | H | 2-methylphenoxy (CH₃) | 2,4,6-trichloro-2,3,5-triazine (2) | " |
| 128 | 2-hydroxynaphthalene-3,6,8-trisulphonic acid (1) | H | " | " | " |
| 129 | 1-phenyl-3-methyl-5-pyrazolone-2',5'-disulphonic acid (4) | H | " | " | goldish-yellow |
| 130 | 2-hydroxynaphthalene-6,8-disulphonic acid (1) | H | naphthyl-SO₃H | " | red |
| 131 | 2-hydroxynaphthalene-6,8-disulphonic acid (1) | H | naphthyl-SO₃H | 2,4,6-trichloro-1,3,5-triazine (2) | goldish-yellow |
| 132 | 1-hydroxynaphthalene-4-sulphonic acid (4) | —SO₃H | " | " | red |
| 133 | 2-hydroxynaphthalene-8-sulphonic acid (1) | " | " | " | " |
| 134 | " | H | naphthyl-SO₃H | " | " |
| 135 | " | H | OH, SO₃H, SO₃H naphthalene | " | red with bluish tinge |
| 136 | " | H | OH, SO₃H naphthalene | " | red |
| 137 | N-ethyl-N-benzylaniline-3'-sulphonic acid (4) | H | 2,5-dimethoxy-4-methylphenyl (OCH₃, CH₃) | 5-chloro-2,4,6-trifluoropyrimidine (4) | purple |
| 138 | 2-hydroxynaphthalene-6,8-disulphonic acid (1) | H | " | " | red |
| 139 | " | H | " | 2,4,6-trichloro-1,3,5-triazine (2) | red |
| 140 | " | H | " | 2-anilino-4,6-dichloro-s-triazine (4) | red |
| 141 | " | H | " | 2-anilino-4,6-dichloro-s-triazine-4'-sulphonic acid (4) | red |

EXAMPLE 142

19.8 Parts of 3,8-diaminodibenzofuran are suspended in 150 parts water and 25 parts hydrochloric acid at 0° – 2°. Then a solution consisting of 14 parts sodium nitrite in 60 parts water is added drop by drop to the suspension, keeping the temperature between 0° and 5°.

After 30 minutes a solution consisting of 30.4 parts 1-hydroxynaphthalene-3,6-disulphonic acid, 8 parts sodium carbonate and 200 parts water is added by drops to the tetrazo solution. The coupling mass is stirred 2 hours at 0° – 5°, after which it is poured into a vessel containing 13.7 parts p-cresidine, 100 parts acetone, 70 parts water and 25 parts of a 30% aqueous hydrochloric acid solution. The coupling mixture is stirred for a further hour, with the pH below 1. By adding a 25% aqueous sodium acetate solution drop by drop over 3 hours, the pH of the suspension is greatly adjusted to 4.5.

The pH of the suspension is adjusted to 7 with caustic soda solution, after which the precipitated product is removed by suction, washed with an aqueous sodium chloride solution and dried at 100°. The condensation of the aminodisazo compound with cyanuric chloride is effected in analogous manner to Example 120.

The dyestuff of the formula:

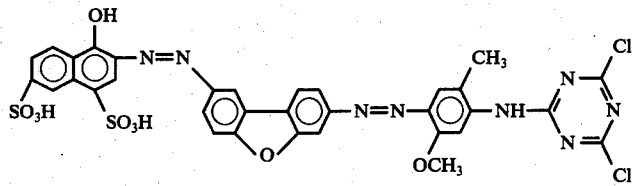

will dye cellulosic fibres to shades fast to light, washing, water and perspiration, and wook silk and nylon to scarlet tones which stand up to light, washing, water, perspiration, milling and dry cleaning.

EXAMPLE 143

32 Parts of 3-acetylamino-8-aminodibenzofuran-7-sulphonic acid (obtained by acetylating 3,8-diaminodibenzofuran-7-sulphonic acid with acetic anhydride in aqueous medium at room temperature) are dissolved in 100 parts water and 10 parts 30% aqueous sodium hydroxide solution at room temperature. To this solution 3.5 parts sodium nitrate are added, stirring 15 minutes. The solution is then added drop by drop within 30 minutes, accompanied by stirring, into 30 parts concentrated hydrochloric acid and 150 parts water at 0° – 5°, continuing to stir the resulting diazo suspension for a further half-hour. A solution consisting of 30.4 parts 1-hydroxynaphthalene-3,6-disulphonic acid, 20 parts of a 30% aqueous sodium hydroxide solution and 200 parts water is added dropwise to the diazo suspension. The coupling mass is stirred for 2 hours at 0° – 5°. Then the resulting suspension is heated to 90°, and after adding 50 parts of a 30% aqueous hydrochloric acid it is boiled for 3 hours at 90°. The precipitated aminoazo product is filtered at 60° and washed with a 10% hydrochloric acid solution, stirred into 200 parts water and dissolved with 20 parts of 30% aqueous sodium hydroxide solution. To this solution 3 parts sodium nitrate are added, after which the nitrite-containing solution is added dropwise to 25 parts hydrochloric acid and 150 parts water at 0° – 5°, accompanied by stirring. The resulting diazo suspension is stirred for a further half-hour.

After this a solution containing 12 parts p-cresidine, 100 parts acetone and 70 parts water is added to the diazo suspension. By adding a 25% aqueous sodium acetate solution is drops over a period of 3 hours, the pH of the suspension is gradually adjusted to 4.5. The coupling mixture is stirred 4 hours, during which the temperature may be allowed to rise to room temperature. The pH of the suspension is adjusted to 7, the precipitated dyestuff is then removed by suction and washed with an aqueous sodium chloride solution. Condensation of the aminodisazo dyestuff obtained with cyanuric chloride is effected in analogous manner to Example 120. The dyestuff is dried under vacuum at 40° – 50°. In the milled state it is a brown powder, which dissolves in water to a scarlet colour. The dyestuff of the formula

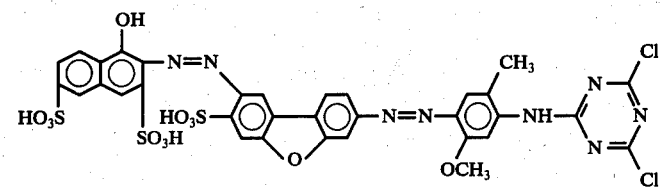

will dye cellulosic fibres to shades fast to light, washing, water and perspiration and wool, silk and synthetic polyamide to tones which stand up to light, washing, water, perspiration, milling and dry cleaning.

In the Table V that follows, the structures of further dyestuffs are given which can be produced according to the directions in Example 143. They correspond to the formula:

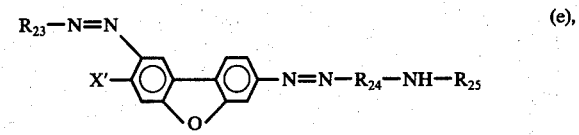

in which the symbols $R_{23}$, $R_{24}$, $X'$ and $R_{25}$ denote the initial compounds and radicals used in the production of the azo compounds of formula (e), which are given in the appropriate columns of the table. The colour shade produced on cellulose and polyamide is indicated in a further column (I).

Table V

| No. | $R_{23}$ | X' | $R_{24}$ | $R_{25}$ | I |
|---|---|---|---|---|---|
| 144 | 1-hydroxynaphthalene-3,6-disulphonic acid (2) | H |  | 2,4,6-trichloro-1,3,5-triazine (2) | scarlet |
| 145 | " | H |  | " | " |
| 146 | 2-hydroxynaphthalene-6,8-disulphonic acid (1) | H | " | " | " |
| 147 | " | H | " | 2,4,5,6-tetrachloro-pyrimidine (4) | " |
| 148 | " | H | " | 5-chloro-2,4,6-tri-fluoropyrimidine (4) | " |
| 149 | " | H | 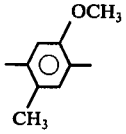 | " | " |
| 150 | " | H | 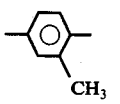 | 2,4,6-trichloro-1,3,5-triazine (2) | " |
| 151 | 2-hydroxynaphthalene-3,6,8-trisulphonic acid (1) | H | " | " | " |
| 152 | 1-phenyl-3-methyl-5-pyrazolone-2',5'-disulphonic acid (4) | H | " | " | goldish-yellow |
| 153 | 2-hydroxynaphthalene-6,8-disulphonic acid (1) | H | 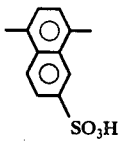 | " | red |
| 154 | " | H | 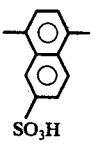 | " | " |
| 155 | 1-hydroxynaphthalene-4-sulphonic acid (2) | —SO₃H | 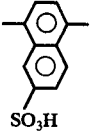 | 2,4,6-trichloro-1,3,5-triazine (2) | red |
| 156 | 2-hydroxynaphthalene-8-sulphonic acid (1) | " | " | " | " |
| 157 | " | H | 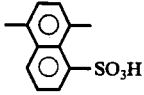 | " | " |
| 158 | " | H | 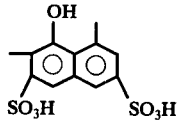 | " | red with bluish tinge |
| 159 | " | H | 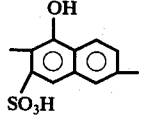 | " | red |

Table V-continued

| No. | R₂₃ | X' | R₂₄ | R₂₅ | I |
|---|---|---|---|---|---|
| 160 | N-ethyl-N-benzylaniline-3'-sulphonic acid (4) | H | 2,5-dimethyl-4-methoxyphenyl (OCH₃, CH₃) | 5-chloro-2,4,6-trifluoropyrimidine (4) | purple |
| 161 | 2-hydroxynaphthalene-6,8-disulphonic acid (1) | H | " | " | red |
| 162 | " | H | " | Cyanuric chloride (2) | red |
| 163 | " | H | " | 2-anilino-4,6-dichloro-S-triazine (4) | red |
| 164 | " | H | " | 2-anilino-4,6-dichloro-S-triazine-4'-sulphonic acid (4) | red |
| 164a | 1-hydroxynaphthalene-3,6-disulphonic acid (2) | —SO₃H | phenyl | 5-chloro-2,4,6-trifluoropyrimidine (4) | red |
| 164b | 1-phenyl-3-methyl pyrazolone-5-(2',5'-disulphonic acid (4) | H | naphthyl-SO₃H | 2,4,6-trichloro-1,3,5-triazine (2) | orange |

EXAMPLE 165

75,6 Parts of the dyestuff of Example 100 are dissolved in 1000 parts water at 60° and mixed with 30 parts sodium acetate and 115 parts of a molar copper sulphate solution. Within 3 hours 29 parts of a 40% hydrogen peroxide solution are added drop by drop at a temperature of 60° – 65°, maintaining the pH at 5.0 – 5.5 by dropping in a 30% ammonia solution. The copper complex is precipitated by adding sodium chloride, filtered off and washed with a dilute aqueous sodium chloride solution. The dyestuff of the formula:

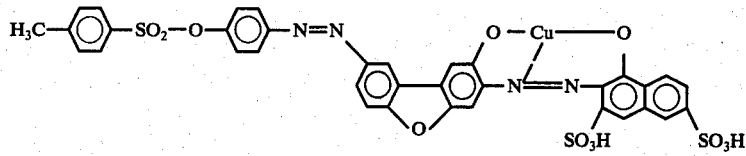

will dye natural and synthetic polyamides and celluloses to fast brown tones.

Set out in Table VI are the structures of further dyestuffs which can be produced according to the directions under Example 165.

| Example No. | Initial dyestuff from Example No. | Complex dyestuff | I |
|---|---|---|---|
| 166 | 101 | H₅C₂O—⟨⟩—N=N—... O—Cu—O ...SO₃H SO₃H | brown |
| 167 | 95 | H₃C—O—⟨⟩—N=N—... O—Cu—O ...HO₃S... SO₃H | brown |

-continued

| Example No. | Initial dyestuff from Example No. | Complex dyestuff | I |
|---|---|---|---|
| 168 | 99 | (structure) | dark brown |
| 169 | 111 | (structure) | brown |
| 170 | 57 | (structure) | brown |
| 171 | 56 | (structure) | reddish brown |
| 172 | 65 | (structure) | reddish brown |
| 173 | 74 | (structure) | reddish brown |

EXAMPLE 174

If in Example 165, p-cresol is used as second coupling component instead of phenol, the disazo dyestuff can no longer be tosylated. It is however possible to treat the resulting disazo dyestuff under the same conditions as in Example 165, though with twice the quantity of sodium acetate, copper sulphate and hydrogen peroxide. The dyestuff obtained with the formula:

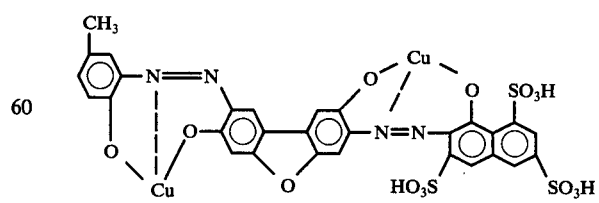

will dye polyamide and cellulose fibers to navy blue shades.

The following examples can be produced in similar manner to that described under Example 165.

EXAMPLE 175

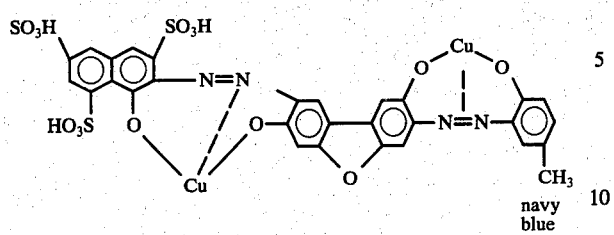

navy blue

EXAMPLE 176

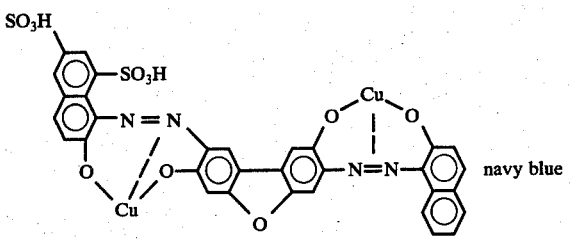

navy blue

EXAMPLE 177

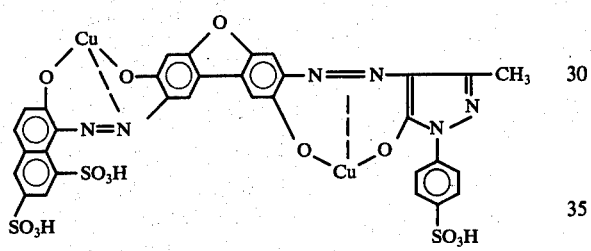

EXAMPLE 178

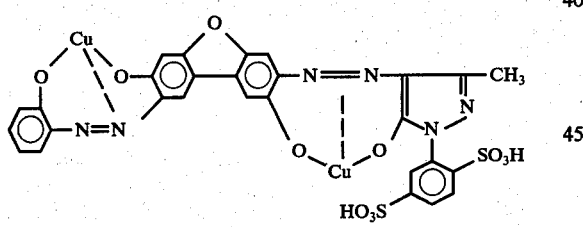

EXAMPLE 179

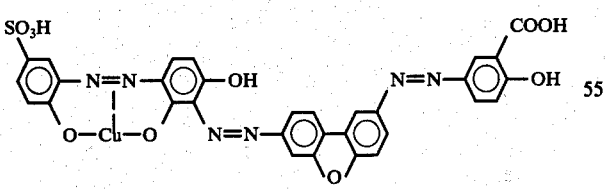

APPLICATION

The compounds of formula I specifically exemplified above may dye various substrates using methods conventional in themselves and appropriate to the particular dyestuff and substrate. Thus, for example, dyeing with metal-containing dyestuffs may be carried out in similar ways to that described in French Pat. No. 1,570,531, dyeing with anionic dyestuffs in similar ways to that described in Belgian Pat. No. 732,845, dyeing with reactive dyestuffs in similar ways to that described in French Pat. No. 1,420,687, and the dyeing of leather in ways similar to those described in Belgian Pat. No. 745,821.

What is claimed is:

1. A compound of the formula

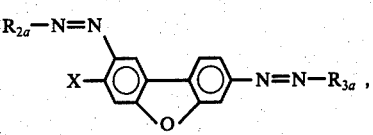

or a salt thereof, wherein (a) one of $R_{2a}$ and $R_{3a}$ is

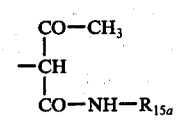

and the other is

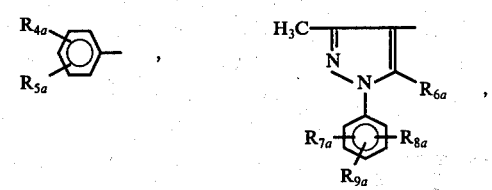

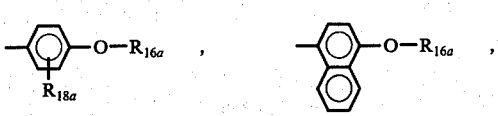

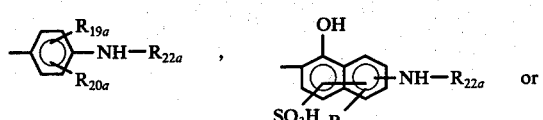

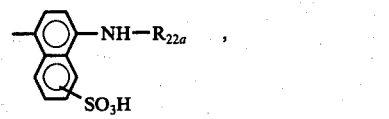

b. one of $R_{2a}$ and $R_{3a}$ is

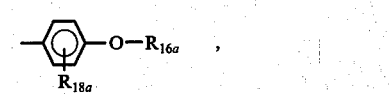

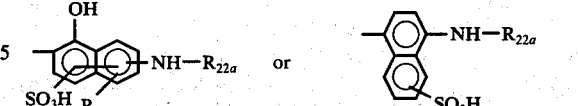

and the other is 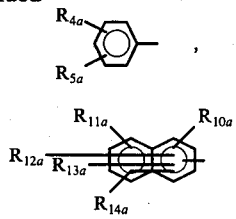

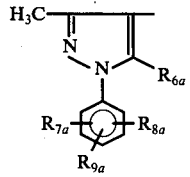 or 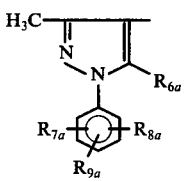, c. one of $R_{2a}$ and $R_{3a}$ is

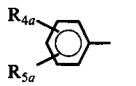

and the other is

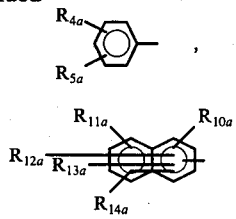,

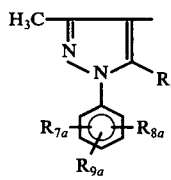 or 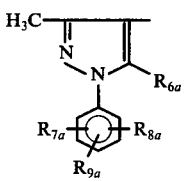 or (d) $R_{2a}$ is 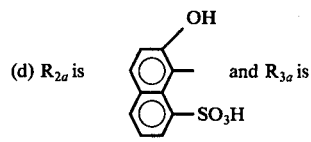 and $R_{3a}$ is

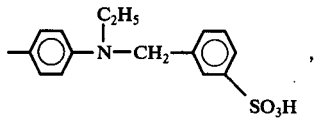, wherein $R_{4a}$ is hydrogen, hydroxy, sulfo or

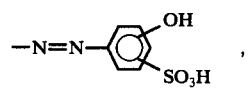, $R_{5a}$ is hydroxy, carboxy, amino, N-($C_{1-4}$alkyl)amino, N-phenylamino, N,N-di-($C_{1-4}$alkyl)amino, N-($C_{1-4}$alkyl) N-($C_{1-4}$alkyl)phenylamino, N-($C_{1-4}$alkyl)-N-benzylamino or N-($C_{1-4}$alkyl) N-($C_{1-4}$alkyl)phenylsulfamoyl, each $R_{6a}$ is independently amino or hydroxy,
each $R_{7a}$ and $R_{8a}$ is independently hydrogen, $C_{1-4}$alkyl, halo or sulfo,
each $R_{9a}$ is independently hydrogen, $C_{1-4}$alkyl, halo or cyano,
$R_{10a}$ is hydroxy, amino or acetamido,
$R_{11a}$ is hydrogen, carboxy or hydroxy,
$R_{12a}$ is hydrogen, sulfo, $C_{1-4}$alkyl, $C_{1-4}$alkylsulfonyl, $C_{1-4}$alkoxy, $C_{1-4}$alkylamino, phenylamino, ($C_{1-4}$alkoxy)phenylamino or trimethylphenylamino, each of $R_{13a}$ and $R_{14a}$ is independently hydrogen or sulfo,
each $R_{15a}$ is independently 2-ethylhexyl, butyl, phenyl, ($C_{1-4}$alkyl)phenyl, ($C_{1-4}$-alkoxy)phenyl, di-($C_{1-4}$alkoxy)phenyl or disulfonaphthyl,
$R_{16a}$ is $C_{1-4}$alkyl, phenylsulfonyl or ($C_{1-4}$alkyl)phenylsulfonyl,
$R_{18a}$ is hydrogen or $C_{1-4}$alkyl,
$R_{19a}$ is hydrogen or $C_{1-4}$alkyl,
$R_{20a}$ is hydrogen, halo, $C_{1-4}$alkyl or $C_{1-4}$alkoxy,
$R_{21a}$ is hydrogen or sulfo, and
$R_{22a}$ is 4,6-dichloro-1,3,5-triazinyl-2,2,6-dichloropyrimidyl-4,2,5,6-trichloropyrimidyl-4,4-chloro-6-(4'-sulfophenylamino)-1,3,5-triazinyl-2,4-chloro-6-(phenylamino)-1,3,5-triazinyl-2 or 5-chloro-2,6-difluoropyrimidyl-4, and X is hydrogen or sulfo, with the provisos that (1) the compound contains 1, 2, 3 or 4 sulfo groups, (2) $R_{2a}$ and $R_{3a}$ are different, and (3)
X is hydrogen when $R_{3a}$ is

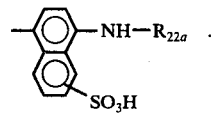,

2. A compound according to claim 1, or a salt thereof, with the proviso that the compound contains 2, 3 or 4 sulfo groups.

3. A compound according to claim 2, or a salt thereof, wherein $R_{2a}$ or $R_{3a}$ is

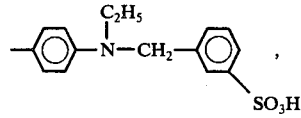, 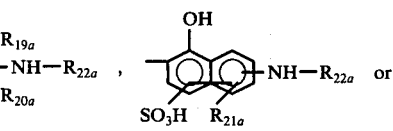 or

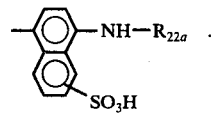.

4. A compound according to claim 3, or a salt thereof, wherein

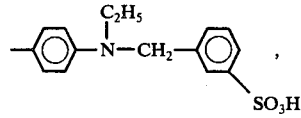 is 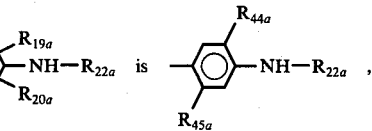, wherein
$R_{22a}$ is 4,6-dichloro-1,3,5-triazinyl-2, 2,6-dichloropyrimidyl-4,2,5,6-trichloropyrimidyl-4,4-chloro-6-(4'-sulfophenylamino)-1,3,5-triazinyl-2,4-chloro-6-(phenylamino)-1,3,5-triazinyl-2 or 5-chloro-2,6-difluoropyrimidyl-4,
$R_{44a}$ is hydrogen, methyl, chloro or methoxy, and
$R_{45a}$ is hydrogen or methyl.

5. A compound according to claim 3, or a salt thereof, wherein

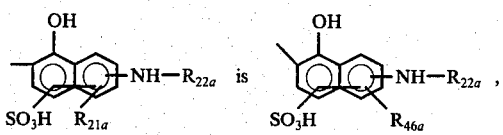 is wherein
R$_{22a}$ is 4,6-dichloro-1,3,5-triazinyl-2,2,6-dichloropyrimidyl-4,2,5,6-trichloropyrimidyl-4,4-chloro-6-(4'-sulfophenylamino)-1,3,5-triazinyl-2,4-chloro-6-(phenylamino)-1,3,5-triazinyl-2 or 5-chloro-2,6-difluoropyrimidyl-4, and
R$_{46a}$ is hydrogen or sulfo.

6. A compound according to claim 1 having the formula

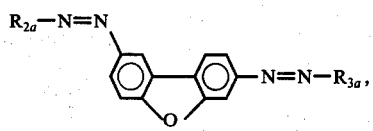

or a salt thereof, wherein one of R$_{2a}$ and R$_{3a}$ is

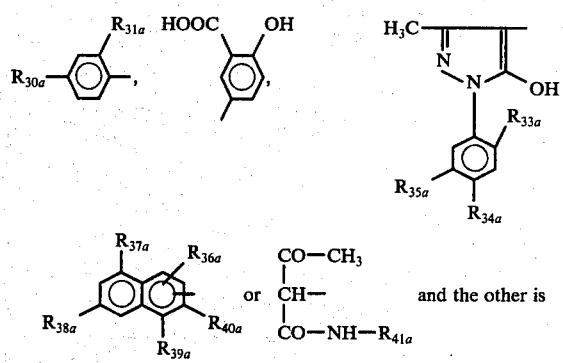

and the other is

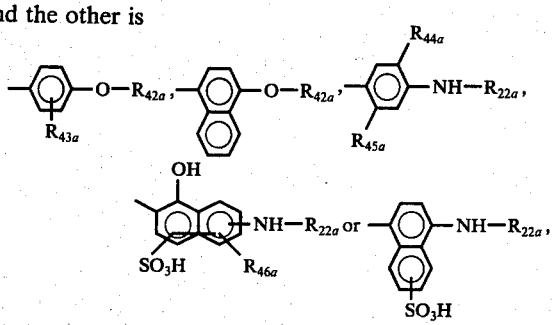

wherein
R$_{22a}$ is 4,6-dichloro-1,3,5-triazinyl-2,2,6-dichloropyrimidyl-4,2,5,6-trichloropyrimidyl-4,4-chloro-6-(4'-sulfophenylamino)-1,3,5-triazinyl-2,4-chloro-6-(phenylamino)-1,3,5-triazinyl-2 or 5-chloro-2,6-difluoropyrimidyl-4,
R$_{30a}$ is hydroxy, carboxy, N-C$_{1-4}$alkylamino, N,N-di-(C$_{1-4}$alkyl)amino, N-phenylamino, N-(C$_{1-4}$alkyl)-N-benzylamino, N-(C$_{1-4}$alkyl)-N-(C$_{1-4}$alkyl)phenylsulfamoyl or 2-hydroxy-5-sulfophenylazo,
R$_{31a}$ is hydrogen or hydroxy, with the proviso that R$_{31a}$ is hydroxy when R$_{30a}$ is hydroxy when R$_{30a}$ is 2-hydroxy-5-sulfophenylazo,
each of R$_{33a}$ and R$_{35a}$ is independently hydrogen or chloro,
R$_{34a}$ is hydrogen, sulfo or chloro,
R$_{36a}$ is hydroxy, amino or acetamido,
R$_{37a}$ is hydrogen, hydroxy, carboxy or sulfo,
each of R$_{38a}$, R$_{39a}$ and R$_{40a}$ is independently hydrogen or sulfo, with the proviso that at least one and not more than three of R$_{37a}$, R$_{38a}$, R$_{39a}$ and R$_{40a}$ are sulfo,
R$_{41a}$ is pheny, methylphenyl, methoxyphenyl, dimethoxyphenyl, 2-ethylhexyl or disulfonaphthyl,
R$_{42a}$ is methyl, ethyl, phenylsulfonyl or p-methylphenylsulfonyl,
R$_{43a}$ is hydrogen or methyl,
R$_{44a}$ is hydrogen, methyl, chloro or methoxy,
R$_{45a}$ is hydrogen or methyl, and
R$_{46a}$ is hydrogen or sulfo.

7. A compound according to claim 6, or a salt thereof, with the proviso that the compound contains 2, 3 or 4 sulfo groups.

8. a compound according to claim 1, or a salt thereof, wherein at least one of R$_{2a}$ and R$_{3a}$ is

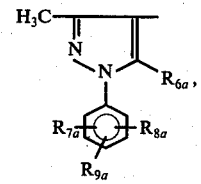

with the proviso that R$_{2a}$ and R$_{3a}$ are different.

9. A compound according to claim 8, or a salt thereof, wherein each

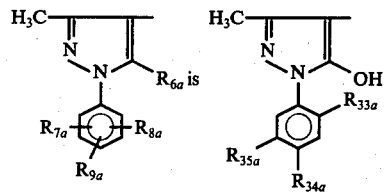

where each of
R$_{33a}$ and R$_{35a}$ is independently hydrogen or chloro, and
R$_{34a}$ is hydrogen, sulfo or chloro.

10. A compound according to claim 8, or a salt thereof, with the proviso that the compound contains 2, 3 or 4 sulfo groups.

11. A compound according to claim 10, or a salt thereof, wherein X is hydrogen.

12. A compound according to claim 1, or a salt thereof, wherein at least one of R$_{2a}$ and R$_{3a}$ is

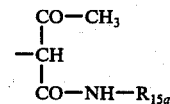

with the proviso that R$_{2a}$ and R$_{3a}$ are different.

13. A compound according to claim 12, or a salt thereof, wherein each R$_{15a}$ is independently phenyl, methylphenyl, methoxyphenyl, dimethoxyphenyl, 2-ethylhexyl or disulfonaphthyl.

14. A compound according to claim 1, or a salt thereof, wherein R$_{2a}$ or R$_{3a}$ is

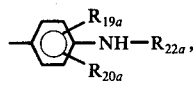

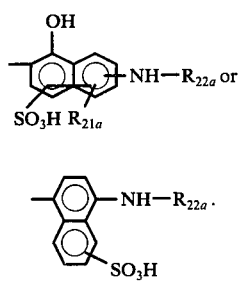

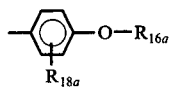

15. A compound according to claim 1, or a salt thereof, wherein $R_{2a}$ or $R_{3a}$ is

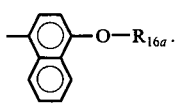

or

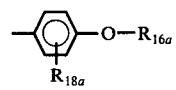

16. A compound according to claim 15, or a salt thereof, wherein

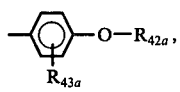

is

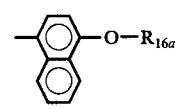

wherein
$R_{42a}$ is methyl, ethyl, phenylsulfonyl or p-methylphenylsulfonyl, and
$R_{43a}$ is hydrogen or methyl.

17. A compound according to claim 15, or a salt thereof, wherein

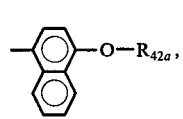

is

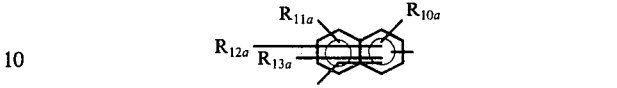

wherein
$R_{42a}$ is methyl, ethyl, phenylsulfonyl or p-methylphenylsulfonyl.

18. A compound according to claim 15, or a salt thereof, wherein one of $R_{2a}$ and $R_{3a}$ is

and the other is

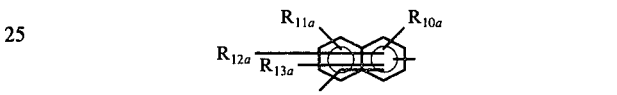

19. A compound according to claim 18, or a salt thereof, wherein

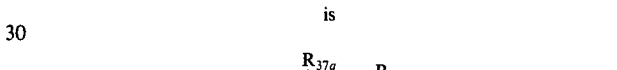

is wherein
$R_{36a}$ is hydroxy, amino or acetamido,
$R_{37a}$ is hydrogen, hydroxy, carboxy or sulfo, and
each of $R_{38a}$, $R_{39a}$ and $R_{40a}$ is independently hydrogen or sulfo, with the proviso that at least one and not more than three of $R_{37a}$, $R_{38a}$, $R_{39a}$ and $R_{40a}$ are sulfo.

20. A compound according to claim 18, or a salt thereof, with the proviso that the compound contains 2, 3 or 4 sulfo groups.

21. A compound according to claim 20, or a salt thereof, wherein X is hydrogen.

22. A compound according to claim 18, or a salt thereof, wherein one of
$R_{2a}$ and $R_{3a}$ is 1-hydroxyl-3-sulfonaphthyl-2,1-hydroxy-3,6-disulfonaphthyl-2,1-hydroxy-3,6,8-trisulfonaphthyl-2,2-hydroxy-6-sulfonaphthyl-1,2-hydroxy-8-sulfonaphthyl-1,2-hydroxy-6,8-disulfonaphthyl-1,2-hydroxy-3,6,8-trisulfonaphthyl-1 or 2-amino-3,6-disulfonaphthyl-1,
the other of $R_{2a}$ and $R_{3a}$ is 4-mothoxphenyl, 4-ethoxyphenyl, 4-phenylsulfonyloxyphenyl, 4-(4'-methylphenylsulfonyloxy)phenyl, 4-methoxy-2-methylphenyl, 4-ethoxy-2-methylphenyl or 2-methyl-4-(4'-methylphenylsulfonyloxy)phenyl, and
X is hydrogen.

23. The compound according to claim 1 having the formula

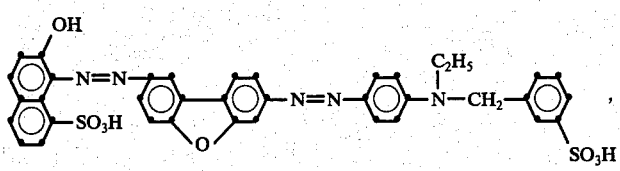

or a salt thereof.

24. The compound according to claim 3 having the formula

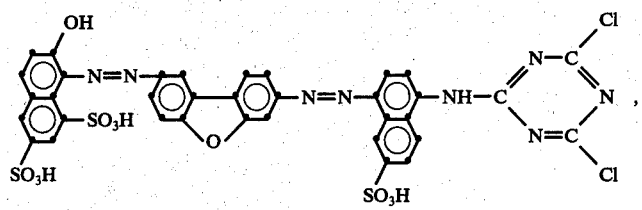

or a salt thereof.

25. The compound according to claim 3 having the formula

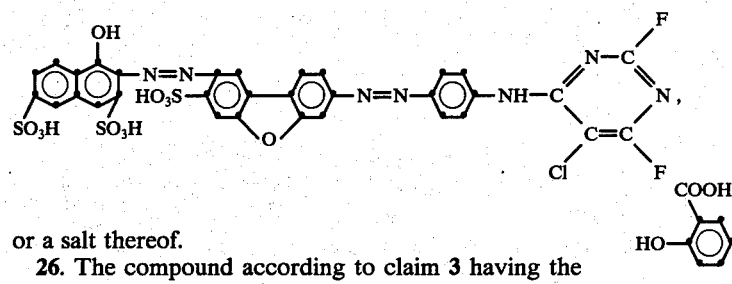

or a salt thereof.

26. The compound according to claim 3 having the formula

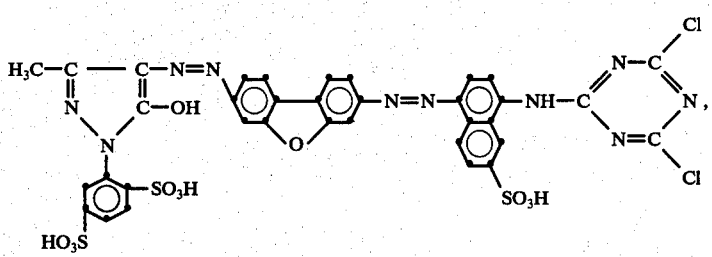

or a salt thereof.

27. The compound according to claim 8 having the formula

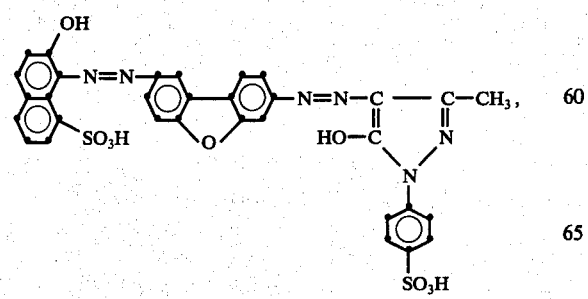

or a salt thereof.

28. The compound according to claim 8 having the formula or a salt thereof.

29. The compound according to claim 18 having the formula

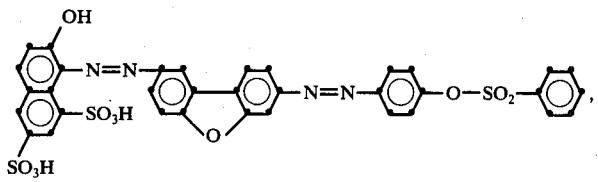

or a salt thereof.

30. The compound according to claim 18 having the formula

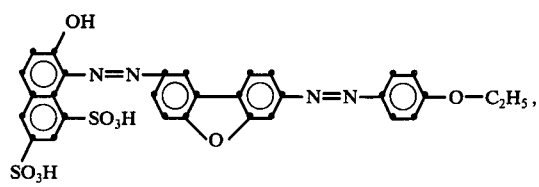

or a salt thereof.

31. The compound according to claim 18 having the formula

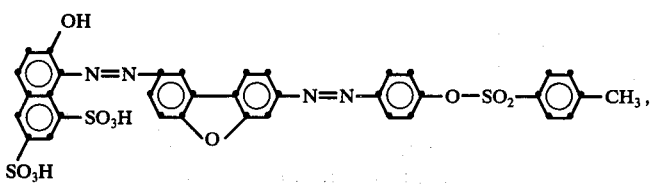

or a salt thereof.

32. The compound according to claim 18 having the formula

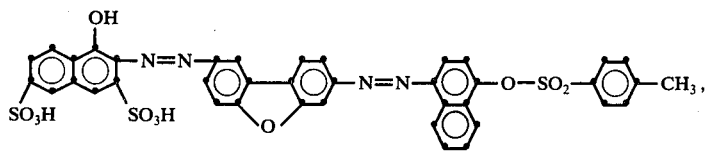

or a salt thereof.

33. The compound according to claim 18 having the formula

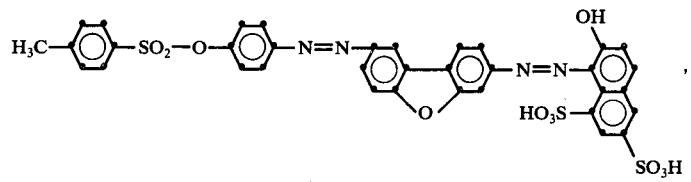

or a salt thereof.

34. The compound according to claim 18 having the formula

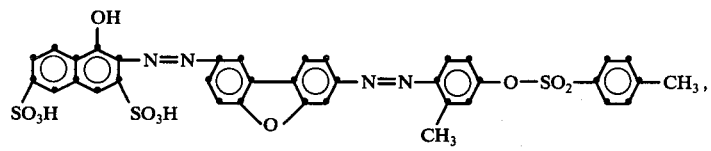

or a salt thereof.

35. The compound according to claim 18 having the formula

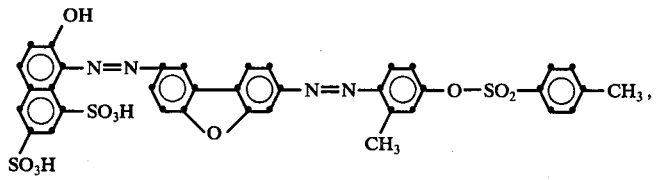

or a salt thereof.

36. The compound according to claim 18 having the formula

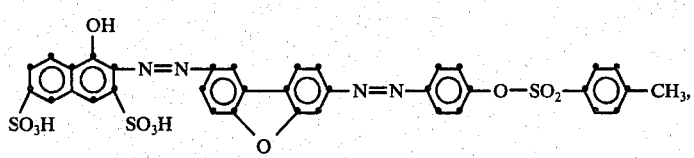

or a salt thereof.

37. The compound according to claim 18 having the formula

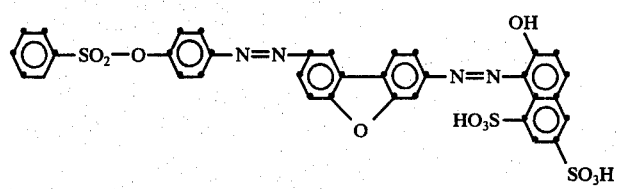

or a salt thereof.

38. The compound according to claim 18 having the formula

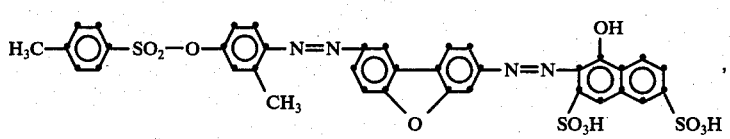

or a salt thereof.

39. The compound according to claim 18 having the formula

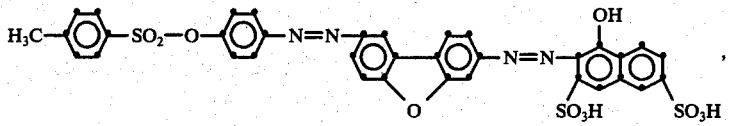

or a salt thereof.

40. The compound according to claim 18 having the formula

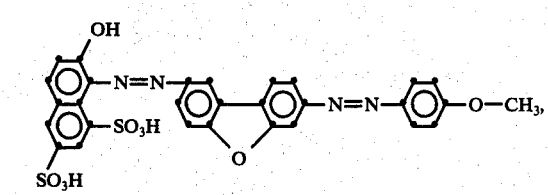

or a salt thereof.

41. The compound according to claim 18 having the formula

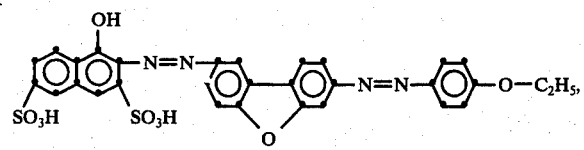

or a salt thereof.

42. The compound according to claim 18 having the formula

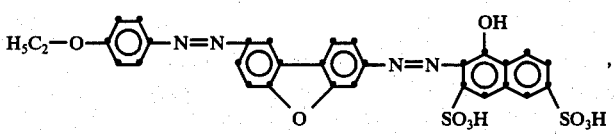

or a salt thereof.

43. The compound according to claim 18 having the formula or a salt thereof.

44. The compound according to claim 18 having the formula

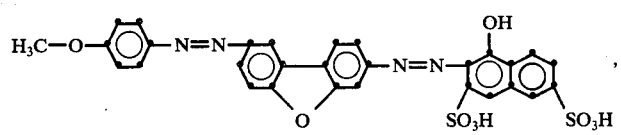
or a salt thereof.